United States Patent
Guo et al.

(10) Patent No.: US 12,524,946 B2
(45) Date of Patent: Jan. 13, 2026

(54) METHOD FOR GENERATING FIREWORK VISUAL EFFECT, ELECTRONIC DEVICE, AND STORAGE MEDIUM

(71) Applicant: Beijing Zitiao Network Technology Co., Ltd., Beijing (CN)

(72) Inventors: Yi Guo, Beijing (CN); Jiali Pan, Beijing (CN); Jing Wang, Beijing (CN); Xiaole Xue, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 258 days.

(21) Appl. No.: 18/268,027

(22) PCT Filed: Nov. 24, 2021

(86) PCT No.: PCT/CN2021/132639
§ 371 (c)(1),
(2) Date: Jun. 16, 2023

(87) PCT Pub. No.: WO2022/142879
PCT Pub. Date: Jul. 7, 2022

(65) Prior Publication Data
US 2024/0037830 A1    Feb. 1, 2024

(30) Foreign Application Priority Data
Dec. 28, 2020 (CN) .......................... 202011583044.3

(51) Int. Cl.
*G06T 13/60* (2011.01)
*G06T 19/20* (2011.01)

(52) U.S. Cl.
CPC .............. *G06T 13/60* (2013.01); *G06T 19/20* (2013.01); *G06T 2210/56* (2013.01); *G06T 2219/2012* (2013.01)

(58) Field of Classification Search
CPC ...... G06T 13/60; G06T 19/20; G06T 2210/56; G06T 2219/2012; A63F 2300/6638; G06F 3/04845; G06F 3/04883
See application file for complete search history.

(56) References Cited

U.S. PATENT DOCUMENTS 8,130,222 B1   3/2012  Urry
8,600,712 B1   12/2013 Harvey
(Continued)

FOREIGN PATENT DOCUMENTS

CN   102147928 A   8/2011
CN   103714568 A   4/2014
(Continued)

OTHER PUBLICATIONS

Reeves: Particle Systems A Technique for Modeling a Class of Fuzzy Objects [online] [Retrieved Apr. 15, 2025], <URL: https://www.lri.fr/~mbl/ENS/IG2/devoir2/files/docs/fuzzyParticles.pdf> (Year: 1983).*

(Continued)

*Primary Examiner* — King Y Poon
*Assistant Examiner* — Vincent Alexander Providence
(74) *Attorney, Agent, or Firm* — Astute IP Law Group

(57) ABSTRACT

A method for generating a firework visual effect, an electronic device, and a non-transitory computer readable storage medium are disclosed. The method for generating the firework visual effect includes: determining a visual effect trajectory; according to the visual effect trajectory, generating a firework particle set and a trail particle set in a three-dimensional space used for generating the firework visual effect; rendering the firework particle set to obtain a firework particle primitive model set; rendering the trail particle set to obtain a trail particle primitive model set; and performing superposition processing on the firework particle (Continued)

primitive model set and the trail particle primitive model set to generate a firework visual effect, wherein at least some trail particle primitive models in the trail particle primitive model set are at least displayed for a preset time period.

17 Claims, 8 Drawing Sheets

(56) References Cited

U.S. PATENT DOCUMENTS

| | | | |
|---|---|---|---|
| 2012/0289262 | A1 | 11/2012 | Huang et al. |
| 2013/0307875 | A1* | 11/2013 | Anderson ............... A63F 13/92 345/633 |
| 2018/0336712 | A1* | 11/2018 | Akaike ................... G06T 13/60 |

FOREIGN PATENT DOCUMENTS

| | | | | |
|---|---|---|---|---|
| CN | 106204696 | A | | 12/2016 |
| CN | 106504311 | A | | 3/2017 |
| CN | 108921927 | A | | 11/2018 |
| CN | 108933895 | A | | 12/2018 |
| CN | 109191550 | A | | 1/2019 |
| CN | 109461205 | A | | 3/2019 |
| CN | 109688346 | A | | 4/2019 |
| CN | 109712219 | A | * | 5/2019 |
| CN | 109993836 | A | | 7/2019 |
| CN | 112700517 | A | | 4/2021 |
| EP | 1085470 | A2 | | 3/2001 |
| JP | 2001155183 | A | | 6/2001 |

OTHER PUBLICATIONS

Hey: Basics of Ribbons in UE4 [online] [Retrieved Apr. 23, 2025], <URL: https://www.artstation.com/blogs/kanoba/p3yX/basics-of-ribbons-in-ue4> (Year: 2019).*

Wikipedia: Tessellation (computer graphics) [online] [Retrieved Apr. 28, 2025], <URL: https://en.wikipedia.org/w/index.php?title=Tessellation_(computer_graphics)&oldid=994030875> (Year: 2020).*

Unity—Manual: Particle system [online] [Retrieved Apr. 23, 2025] <URL: https://web.archive.org/web/20160830001601/https://docs.unity3d.com/462/Documentation/Manual/class-ParticleSystem.html> (Year: 2016).*

Li Hai et al., "Position Controllable and Sound Fireworks Simulation Based on the Particle System," Microcomputer and Applications, School of Computer Science and Technology, Anhui University, Nov. 15, 2013, No. 9, 1 page.

Shi et al., "The Status of Fireworks Simulation based on Particle System", 5th International Conference on Computer Science and Network Technology (ICCSNT), 2016, 4 pages.

Decision to Grant a Patent for Japanese Application No. 2023-536832, mailed on Nov. 26, 2024, 5 pages.

Gan et al., "Study of Fireworks Modeling Method Based on Particle System," Journal of Changchun Normal University (Natural Science), Feb. 2008, vol. 27, No. 1, pp. 63-66.

Ge et al., "Firework Animation Design Based on Particle System," Computer Technology and Development, Aug. 2010, vol. 20, No. 8, 4 pages.

International Search Report and Written Opinion in PCT/CN2021/132639, mailed Feb. 23, 2022, 10 pages.

Li, Hai, "Animation of Fireworks Based on Particle System," Chinese Selected Doctoral Dissertations and Master's Thesis, Information Science and Technology, Nov. 15, 2013, pp. 23-33.

Li, Qingchang, "Research on Particle System Based Fireworks Simulation and Large-scale Fireworks Ordering," Chinese Selected Doctoral Dissertations and Master's Thesis, Information Science and Technology, Dec. 15, 2008, pp. 10-56.

Sun et al., "Simulation Method of New Fireworks," Computer Engineering and Applications, 2016, vol. 52, No. 14, pp. 215-219.

Extended European Search Report for European Patent Application No. 21913621.5, mailed May 10, 2024, 12 pages.

Nishino et al., "A 3D virtual environment for creating new fireworks", Virtual Reality Software and Technology, Proceedings of Thevrst Conference, Jul. 1, 1996, 8 pages.

Teng-See Loke et al., "Rendering Fireworks Displays", IEEE Computer Graphics and Applications, vol. 12, No. 3, May 1, 1992, 11 pages.

Kakogawa group, "Enter our particle system", Nikkei CG, vol. 169, No. 169, Japan, Nikkei BP, Oct. 8, 2000, 9 pages.

Office Action for Japanese Patent Application No. 2023-536832, mailed on Jul. 30, 2024, 8 pages.

* cited by examiner

METHOD FOR GENERATING FIREWORK VISUAL EFFECT, ELECTRONIC DEVICE, AND STORAGE MEDIUM

CROSS-REFERENCE TO RELATED APPLICATION

This is a national stage application filed under 37 U.S.C. 371 based on International Patent Application No. PCT/CN2021/132639, filed Nov. 24, 2021, which claims priority of Chinese Patent Application No. 202011583044.3, filed on Dec. 28, 2020, the disclosures of which are incorporated herein by reference in their entireties.

TECHNICAL FIELD

Embodiments of the present disclosure relate to a method for generating a firework visual effect, an electronic device, and a non-transitory computer-readable storage medium.

BACKGROUND

A particle system may be adopted to implement digital trail visual effects. The three-dimension computer graphics technology may be used for rendering a virtual three-dimension space in the computer; and three-dimension objects in the three-dimension space are depicted by discrete mathematical expressions (e.g., triangular surfaces). These discrete three-dimension objects are referred to as three-dimension (3D) models. In the three-dimension space, colors, textures, light and shadow effects ultimately presented by these three-dimension models are defined and depicted through a series of graphic algorithms and rules. These algorithms and encapsulations that define colors in which the three-dimension objects are visually presented are commonly referred to as three-dimension model materials.

In three-dimension computer graphics, the particle system may be used for simulating visual effects such as fire, explosion, smoke, water flow, sparks, fallen leaves, clouds, fog, snow, dust, meteor trails, luminous trajectories, etc. However, how to obtain a realistic firework visual effect based on the particle system is an urgent problem to be solved by those skilled in the art.

SUMMARY

This Summary is provided to introduce concepts in a brief form, which will be described in detail later in the detailed description. This summary is not intended to identify key features or essential features of the claimed technical solution, nor is it intended to limit the scope of the claimed technical solution.

At least one embodiment of the present disclosure provides a method for generating a firework visual effect, and the firework visual effect includes a firework center and a firework trail, the method includes: determining a visual effect trajectory; based on the visual effect trajectory, generating a firework particle set and a trail particle set in a three-dimension space for generating the firework visual effect, wherein the firework particle set is used for generating the firework center, and the trail particle set is used for generating the firework trail; rendering the firework particle set, to obtain a firework particle primitive model set; rendering the trail particle set, to obtain a trail particle primitive model set, wherein the trail particle primitive model set comprises a plurality of trail particle primitive models; superimposing the firework particle primitive model set and the trail particle primitive model set, to generate the firework visual effect, at least some trail particle primitive models among the plurality of trail particle primitive models are displayed for at least a preset duration.

At least one embodiment of the present disclosure provides an electronic device, the electronic device includes: a memory, configured to store computer-executable instructions in a non-transitory manner; and a processor, configured to run computer-executable instructions, wherein the computer-executable instructions, when run by the processor, implement the method for generating the firework visual effect according to any embodiment of the present disclosure.

At least one embodiment of the present disclosure provides a non-transitory computer-readable storage medium, the non-transitory computer-readable storage medium stores computer-executable instructions, and when executed by the processor, the computer-executable instructions implement the method for generating the firework visual effect according to any embodiment of the present disclosure.

BRIEF DESCRIPTION OF THE DRAWINGS

In order to more clearly explain the technical scheme of the embodiments of the present disclosure, the drawings of the embodiments will be briefly introduced below. Obviously, the drawings in the following description only relate to some embodiments of the present disclosure, and are not limited to the present disclosure.

DETAILED DESCRIPTION

Figure 1:
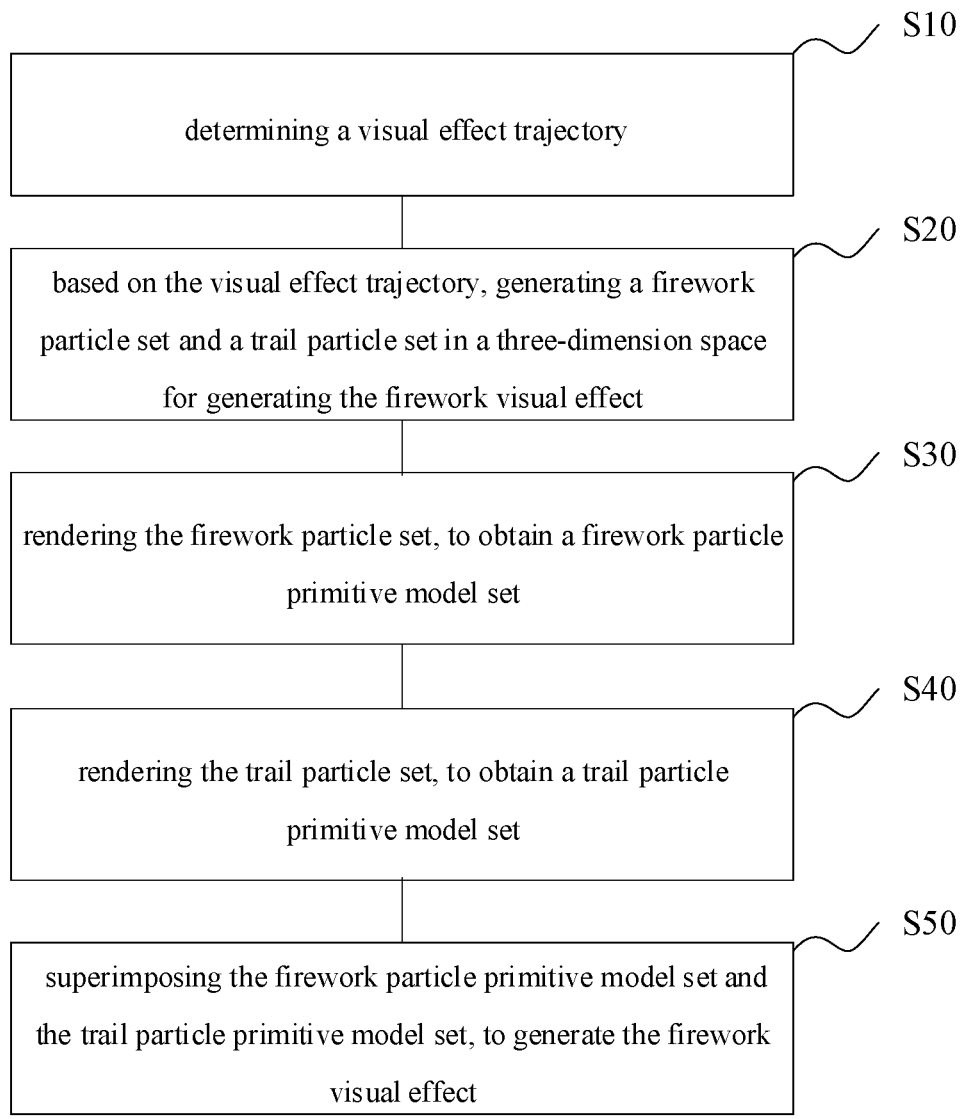
FIG. 1 is a schematic flow chart of a method for generating a firework visual effect provided by at least one embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for thorough and complete understanding of the present disclosure. It should be understood that the drawings and the embodiments of the present disclosure are only for exemplary purposes, and are not intended to limit the protection scope of the present disclosure.

It should be understood that various steps described in the method implementations of the present disclosure may be executed in different orders and/or in parallel. Further, the method implementations may include additional steps and/or omit execution of the steps shown. The scope of the present disclosure will not be limited in this regard.

The term "including" and variants thereof used herein are open including, that is, "including but not limited to". The term "based on" is "at least partially based on". The term "one embodiment" represents "at least one embodiment"; the term "another embodiment" represents "at least one other embodiment"; and the term "some embodiments" represents "at least some embodiments". Relevant definitions of other terms will be given in description below.

It should be noted that concepts such as "first", "second", etc. as mentioned in the present disclosure are only used to distinguish apparatuses, modules or units, but not to define orders or interdependence of functions executed by these apparatuses, modules or units.

It should be noted that modification of "one" and "a plurality of" as mentioned in the present disclosure is exemplary rather than restrictive, and those skilled in the art should understand that unless otherwise explicitly specified in the context, it should be understood as "one or more".

Names of messages or information interacted between a plurality of apparatuses according to the implementations of the present disclosure are only used for illustrative purposes, and are not used to limit the scope of these messages or information.

In graphics, a particle effect refers to a special type of rendering capability encapsulation; for example, generating a group of point sets, that is, a plurality of particles, in a three-dimension space, then replacing each particle in the point set with a 3D model (most commonly a flat model), and then rendering with a specific material so that a particle effect may be generated. A particle effect is usually used to create a visual effect such as cloud, flame, etc.

CPU (Central Processing Unit) particles and GPU (Graphics Processing Unit) particles are two technical means to implement the particle effect.

Each individual particle in a particle effect has a complete particle lifetime, including an initialization stage, an update stage, and a rendering stage; after the rendering stage ends, a particle primitive model corresponding to the particle may be generated.

At least one embodiment of the present disclosure provides a method for generating a firework visual effect, an electronic device, and a non-transitory computer-readable storage medium. The method for generating the firework visual effect includes: determining a visual effect trajectory; based on the visual effect trajectory, generating a firework particle set and a trail particle set in a three-dimension space for generating the firework visual effect, wherein the firework particle set is used for generating the firework center, and the trail particle set is used for generating the firework trail; rendering the firework particle set, to obtain a firework particle primitive model set; rendering the trail particle set, to obtain a trail particle primitive model set, wherein the trail particle primitive model set comprises a plurality of trail particle primitive models; superimposing the firework particle primitive model set and the trail particle primitive model set, to generate the firework visual effect, at least some trail particle primitive models among the plurality of trail particle primitive models are displayed for at least a preset duration.

The method for generating the firework visual effect may visually implement generation of a visual effect of the firework trail with the movement of the firework center through a plurality of particle sets; the generated firework visual effect is a 3-Dimension (3D) special effect, with rich and realistic visual effects, thereby improving the user's visual experience; in addition, the method for generating the firework visual effect may implement real-time generation of the firework visual effect on a mobile terminal, thereby meeting needs of various application scenarios.

It should be noted that the method for generating the firework visual effect provided by the embodiment of the present disclosure may be applied at least partially to appropriate electronic devices; for example, in some embodiments, the method for generating the firework visual effect may be implemented through applications installed in electronic devices or non-installed applications downloaded from, for example, cloud servers. The electronic devices may include personal computers, mobile terminals, etc.; these mobile terminals may be devices such as mobile phones, tablet personal computers, wearable electronic devices, smart home devices, etc. In some embodiments, the method for generating the firework visual effect may also be implemented through a server, or some steps in the method for generating the firework visual effect may be implemented through a server (e.g., a cloud server), while other steps may be implemented through electronic devices; and the electronic devices, for example, communicate with each other through a network (e.g., a wireless or wired communication network).

In the embodiment of the present disclosure, the firework visual effect may include a visual effect displayed on a display interface of an electronic device. The firework visual effect represents a special effect generated based on a particle set that may be exhibited on a terminal, and is a visually visible effect.

Hereinafter, the embodiments of the present disclosure will be illustrated in details in conjunction with the accompanying drawings, but the present disclosure is not limited to these specific embodiments.

FIG. 1 is a schematic flow chart of a method for generating a firework visual effect provided by at least one embodiment of the present disclosure.

For example, as shown in FIG. 1, the method for generating the firework visual effect includes steps S10 to S50.

Step S10: determining a visual effect trajectory.

Step S20: based on the visual effect trajectory, generating a firework particle set and a trail particle set in a three-dimension space for generating the firework visual effect.

Step S30: rendering the firework particle set, to obtain a firework particle primitive model set.

Step S40: rendering the trail particle set, to obtain a trail particle primitive model set.

Step S50: superimposing the firework particle primitive model set and the trail particle primitive model set, to generate the firework visual effect.

The method for generating the firework visual effect may implement the firework visual effect through a plurality of particle sets, with rich and realistic 3D effects, thereby improving the user's visual experience. In some embodiments, by using the method for generating the firework visual effect, a real firework effect may be simulated, for example, a visual effect of a firework trajectory in real-world delayed photography works may be simulated. In other embodiments, a firework visual effect with movement of a target object may also be implemented through combination of technologies such as Augmented Reality (AR) and target object tracking detection; for example, a firework center is presented in a position where the target object is located, a firework trail is presented with movement of the target object, and the firework visual effect and the target object are superimposed for display in the video.

According to an embodiment of the present disclosure, the firework particle set is used for generating a firework center, that is, the firework particle set is used for simulating an effect of the firework center; for example, the firework center may be a visual effect of a handheld firework. The trail particle set is used for generating the firework trail, that is, the trail particle set is used for simulating the effect of the firework trail bearing sparks with movement of the firework center. For example, the trail particle primitive model set obtained by rendering the trail particle set includes a plurality of trail particle primitive models; and in order to create the effect of firework trail, at least some trail particle primitive models among the plurality of trail particle primitive models are displayed for at least a preset duration.

For example, the firework trajectory visual effect is a three-dimension dynamic special effect. When the firework visual effect is used for forming a video clip, firework trajectory visual effects displayed in respective video frames in the video clip may be different from each other.

For example, both the firework particle set and the trail particle set are generated based on the GPU particle technology or the CPU particle technology.

For example, in some embodiments, the visual effect trajectory may be determined according to movement of a visual trajectory point; for example, the visual trajectory point may be a target point to be detected, for example, the target point may be a fingertip of a hand or a preset target object, such as a magic stick prop, etc. For example, step S10 may include: determining the visual trajectory point; and determining the visual effect trajectory according to a movement of the visual trajectory point.

For example, in step S20, the three-dimension space may represent a virtual three-dimension space; and the virtual three-dimension space may be determined by a virtual three-dimension coordinate system. It should be noted that a two-dimension plane may be a special case of the three-dimension space, that is, if a certain dimension of the three-dimension space is 0, the three-dimension space represents a two-dimension plane.

For example, the firework particle set may include a plurality of firework particles; when the visual effect trajectory is determined through the movement of the visual trajectory point, in step S20, the generating a firework particle set in a three-dimension space for generating the firework visual effect, based on the visual effect trajectory, may include: mapping the visual trajectory point as a spatial trajectory point in the three-dimension space; determining an extension trajectory according to a movement of the spatial trajectory point in the three-dimension space, for example, the extension trajectory is a trajectory mapped from the visual effect trajectory into the three-dimension space; generating the plurality of firework particles along the extension trajectory during the movement of the spatial trajectory point; and for each firework particle among the plurality of firework particles, setting attribute values of firework particle attributes corresponding to the firework particle, to obtain a plurality of firework particle attribute values, for example, the firework particle attributes comprise any combination of: particle lifetime, particle size, particle color, particle transparency, particle orientation, particle position, particle velocity, and particle rotation angle.

For example, the generating a plurality of firework particles along the extension trajectory during the movement of the spatial trajectory point, may include: determining that the spatial trajectory point moves to a first position in the extension trajectory; generating at least one firework particle among the plurality of firework particles within a first range of the first position according to a first generation rate.

In other embodiments, the visual effect trajectory may be a preset visual effect trajectory, for example, the visual effect trajectory may be a preset cardioid trajectory, a pentagram trajectory, a text trajectory, etc.

When the visual effect trajectory is a preset trajectory, in step S20, the generating a firework particle set in a three-dimension space for generating the firework visual effect, based on the visual effect trajectory, may include: mapping the visual effect trajectory as an extension trajectory in the three-dimension space; sequentially selecting any trajectory point on the extension trajectory as a spatial trajectory point along the extension trajectory, and generating at least one firework particle among the plurality of firework particles within a first range of a position where the spatial trajectory point is located according to the first generation rate; and for each firework particle among the plurality of firework particles, setting attribute values of firework particle attributes corresponding to the firework particle, to obtain a plurality of firework particle attribute values, wherein the firework particle attributes comprise any combination of: particle lifetime, particle size, particle color, particle transparency, particle orientation, particle position, particle velocity, and particle rotation angle.

The firework particle attributes corresponding to the firework particle may be reflected in a firework particle primitive model corresponding to the firework particle rendered. For example, if a particle size among the firework particle attributes corresponding to the firework particle is set to 1 meter*1 meter, it indicates that after rendering the firework particle, a size of the firework particle primitive model corresponding to the firework particle is 1 meter*1 meter. A particle lifetime among the firework particle attributes corresponding to the firework particle is a lifetime of the firework particle primitive model corresponding to the firework particle.

It should be noted that, in the present disclosure, "meter" refers to a unit of size in the three-dimension space determined in the virtual three-dimension coordinate system.

Initial attribute values of each firework particle attribute may include an initial value of particle size, an initial value of particle color, an initial value of particle transparency, an initial value of particle orientation, an initial value of particle position, an initial value of particle rotation angle, and an initial value of particle velocity, etc. In addition, within the particle lifetime of the firework particle, the electronic device may update the attribute values of the firework particle attributes corresponding to the firework particle based on predetermined settings.

The first generation rate represents a rate at which firework particles are generated, that is, firework particles in the firework particle set may be generated at a fixed first generation rate; for example, the first generation rate may be S1 firework particles generated per second. For example, in some embodiments, S1 firework particles generated per second may represent one firework particle generated every other 1/(S1) second. A specific value of S1 may be selected based on an actual effect, which will not be limited here.

For example, the first range may be a three-dimension region that includes the first position (i.e., the position where the spatial trajectory point is located). For example, the three-dimension region may be a sphere, a cube, a cuboid, an ellipsoid, etc. For example, the position where the spatial trajectory point is located may be an arbitrary position in the three-dimension region; for example, the position where the spatial trajectory point is located is a center of the sphere, for example, the center of the sphere may be an origin of the virtual three-dimension coordinate system.

For example, in some embodiments, initial generation positions (i.e., the first position, or the position where the spatial trajectory point is located) of respective firework particles in the firework particle set are all identical, for example, all located at the origin of the virtual three-dimension coordinate system; in other embodiments, the initial generation positions corresponding to the respective firework particles in the firework particle set are all located at arbitrary positions in the three-dimension region including the origin of the virtual three-dimension coordinate system, that is to say, an initial generation position of each firework particle may be set to an arbitrary position within the three-dimension region.

The particle lifetime of firework particles may be relatively short, which may better demonstrate a flickering effect of firework. For example, the particle lifetime among the firework particle attributes may be a fixed value or a random value within a first lifetime range, which will not be limited in the present disclosure.

The particle color corresponding to the firework particle may be an arbitrary color; for example, in some embodiments, an initial value of particle color corresponding to the firework particle may be white. In order to enhance brightness of the firework center, the particle color corresponding to the firework particle may be brightened as whole.

For example, in some embodiments, within the particle lifetime of the firework particle, the particle color corresponding to the firework particle remains unchanged. For example, in other embodiments, within the particle lifetime of the firework particle, the particle color corresponding to the firework particle may also change.

It should be noted that, in the particle set (e.g., the firework particle set/the trail particle set), a final display color of a particle primitive model corresponding to each particle is a result of multiplying the particle color with a color of a particle map, and final display transparency of a particle primitive model corresponding to each particle is a result of multiplying the particle transparency with transparency of the particle map.

A particle rotation angle corresponding to the firework particle may be an arbitrary value, for example, when generating the firework particle, an angle may be randomly selected from 0 to 360 degrees as an initial value of the particle rotation angle among the firework particle attributes corresponding to the firework particle. It should be noted that the "particle rotation angle" here is not a dynamic velocity, but a static "direction", referring to a rotation offset around an axis (a direction of a patch model towards a virtual camera) when generating a patch model corresponding to the particle during the rendering stage, under the premise of ensuring that the patch model is oriented towards the virtual camera.

The firework particle primitive model set includes a plurality of firework particle primitive models; step S30 may include: respectively rendering the plurality of firework particles based on the plurality of firework particle attribute values, to obtain a plurality of firework particle primitive models; and here, the firework center is formed by superimposing the plurality of firework particle primitive models.

In step S30, the respectively rendering the plurality of firework particles based on the plurality of firework particle attribute values, to obtain a plurality of firework particle primitive models, may include: with respect to each firework particle: acquiring a firework particle map group corresponding to each firework particle, and rendering each firework particle based on the firework particle map group and attribute values of firework particle attributes corresponding to each firework particle, to obtain a firework particle primitive model corresponding to each firework particle.

With respect to each firework particle, during each rendering procedure, firstly, determining a state of a firework particle attribute of the firework particle at a rendering moment, updating the firework particle attribute values corresponding to the firework particle based on the state of the firework particle attribute, to obtain the updated firework particle attribute values; and then, obtaining the firework particle map group corresponding to the firework particle; and rendering the firework particle based on the firework map in the corresponding firework particle map group and the updated firework particle attribute values, to obtain the firework particle primitive model corresponding to the firework particle.

In a particle lifetime of each firework particle, updating the firework particle attribute values corresponding to the firework particle according to a rendering frame rate, and rendering the firework particle based on the updated firework particle attribute values and the corresponding firework particle map group, to obtain the firework particle primitive model corresponding to the firework particle. Therefore, changes of the firework particle primitive model over time may be simulated.

During the rendering procedure, the rendering frame rate may be set according to actual situations, for example, the rendering frame rate may be 5 times/second, 10 times/second, etc.

During the rendering procedure, a firework map corresponding to each firework particle always faces the virtual camera, that is, a position and a direction in which a lens of the virtual camera is located. For example, each firework particle among the plurality of firework particles may be subjected to a plurality of renderings, and during each rendering procedure of each firework particle, the firework map adopted has a random rotation angle around a normal of a plane within the plane facing the virtual camera used for rendering.

In the present disclosure, a rendering mode for the firework particle set is a patch model, that is, each firework particle is rendered in a form of a patch model combined with a specific material; for example, the patch model may be a triangular patch model.

The plurality of firework particles include at least one central particle; and the at least one central particle is used for generating a central portion of the firework center, that is, the central particle is used for simulating an effect of the central portion of the firework.

An initial value of the particle size corresponding to the central particle may be a random value within a central size range; and the central size range may be set according to actual situations, which will not be limited in the present disclosure.

Within the particle lifetime of the central particle, the particle size corresponding to the central particle may continuously change, for example, the particle size corresponding to the central particle may expand from the initial value of the particle size corresponding to the central particle to N1 times the initial value of the particle size corresponding to the central particle, where, N1 is greater than 1. A change of the particle size corresponding to each central particle, combined with a relatively short particle lifetime, may be used for demonstrating an outward diffusion effect of firework.

A particle velocity corresponding to each central particle may be an arbitrary value, for example, 0, that is, each central particle does not move in a particle lifetime thereof.

For example, an initial value of particle transparency corresponding to the central particle may be an arbitrary value; for example, in some embodiments, the initial value of the particle transparency corresponding to the central particle may be 1, that is, completely opaque. If the attribute value of the particle transparency is 0, it indicates complete transparency. The closer the attribute value of the particle transparency to 1, the more opaque it indicates, and the closer the attribute value of the particle transparency to 0, the more transparent it indicates.

In some embodiments, within the particle lifetime of the central particle, the particle transparency corresponding to the central particle remains unchanged.

The firework particle map group includes a central particle map group; the central particle map group includes a plurality of central maps different from each other. Within a particle lifetime of any central particle, switching a plurality of central maps according to a preset switching frequency, which is used for rendering a visual effect of any central particle, to obtain a firework particle primitive model corresponding to the any central particle.

For example, the switching frequency may be Q1 times per second. For example, if the particle lifetime of the central particle is 1 second and the rendering frame rate is Q1 times/second, then Q1 renderings may be performed within the particle lifetime of the central particle, and the central map used for rendering needs to be switched for each rendering. A specific value of Q1 may be selected according to actual effects, which will not be limited here.

Figure 2A:
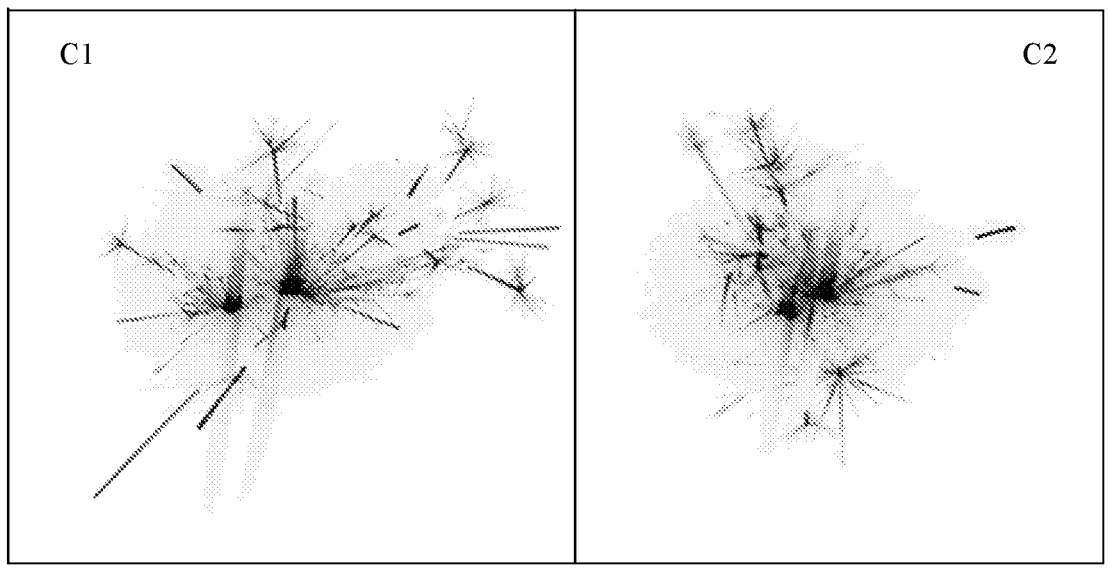
FIG. 2A is a schematic diagram of respective central maps in a central particle map group provided by at least one embodiment of the present disclosure.

For example, FIG. 2A shows respective central maps in the central particle map group. As shown in FIG. 2A, the central map may include a central map C1 and a central map C2.

For example, with respect to each central particle, in the initialization stage, a central map will be randomly selected from the respective central maps for rendering and displaying; then, in the particle lifetime of the central particle, the central map used for rendering may be further switched randomly or sequentially according to the switching frequency (e.g., a set frequency or a frequency changed with time, etc.).

For example, with respect to the central map shown in FIG. 2A, when a certain central particle is subjected to multiple renderings, during a first rendering, the central map C1 on a left side is used for rendering; then, during a second rendering, if the map needs to be switched, the central map C2 on a right side is used for rendering; then during a third rendering, if the map needs to be switched, the central map C1 on a left side is used for rendering; then, during a fourth rendering, if the map needs to be switched, the central map C2 on a right side is used for rendering; and so on.

It should be noted that the central map is not limited to the situation shown in FIG. 2A, and more or other central maps may also be adopted to render the central particle.

In addition, the plurality of firework particles further include at least one spark particle; the at least one spark particle is used for generating a spark portion in the firework center that moves along a path away from the central portion, that is, the spark particle is used for simulating an effect of spark debris flying in a direction away from the central portion in the firework center, reflecting scattered sparks during a firework discharge process. Because the spark has a flying process, a particle lifetime of each spark particle may be set to be longer than a particle lifetime of each central particle.

An initial value of a particle size corresponding to the spark particle may be a random value within a spark size range; and the spark size range may be set according to actual situations, which will not be limited in the present disclosure.

Within the particle lifetime of the spark particle, the particle size corresponding to the spark particle may gradually decrease, ultimately reducing to 0.

An initial value of particle transparency corresponding to the spark particle may be any value; for example, in some embodiments, the initial value of the particle transparency corresponding to the spark particle may be 1.

Within the particle lifetime of the spark particle, the particle transparency corresponding to the spark particle gradually decreases, and the final particle transparency becomes 0, that is, the firework particle primitive model corresponding to the spark particle ultimately becomes completely transparent.

An initial value of a particle velocity corresponding to the spark particle may be any value within a preset velocity range, that is, the spark particle may move within the particle lifetime.

Within the particle lifetime of the spark particle, a movement trajectory and a movement velocity of the spark particle may be related to gravity or resistance, that is to say, the procedure of sparks flying in the three-dimension space may be seen on a visual effect.

The firework particle map group includes a spark particle map group; the spark particle map group includes a plurality of spark maps that are different from each other; within the particle lifetime of the spark particle, the spark map for rendering the spark particle may remain unchanged. The present disclosure is not limited thereto; and within the particle lifetime of the spark particle, the plurality of spark maps may also be randomly or sequentially switched according to a preset switching frequency for rendering the visual effect of the spark particle.

Figure 2B:
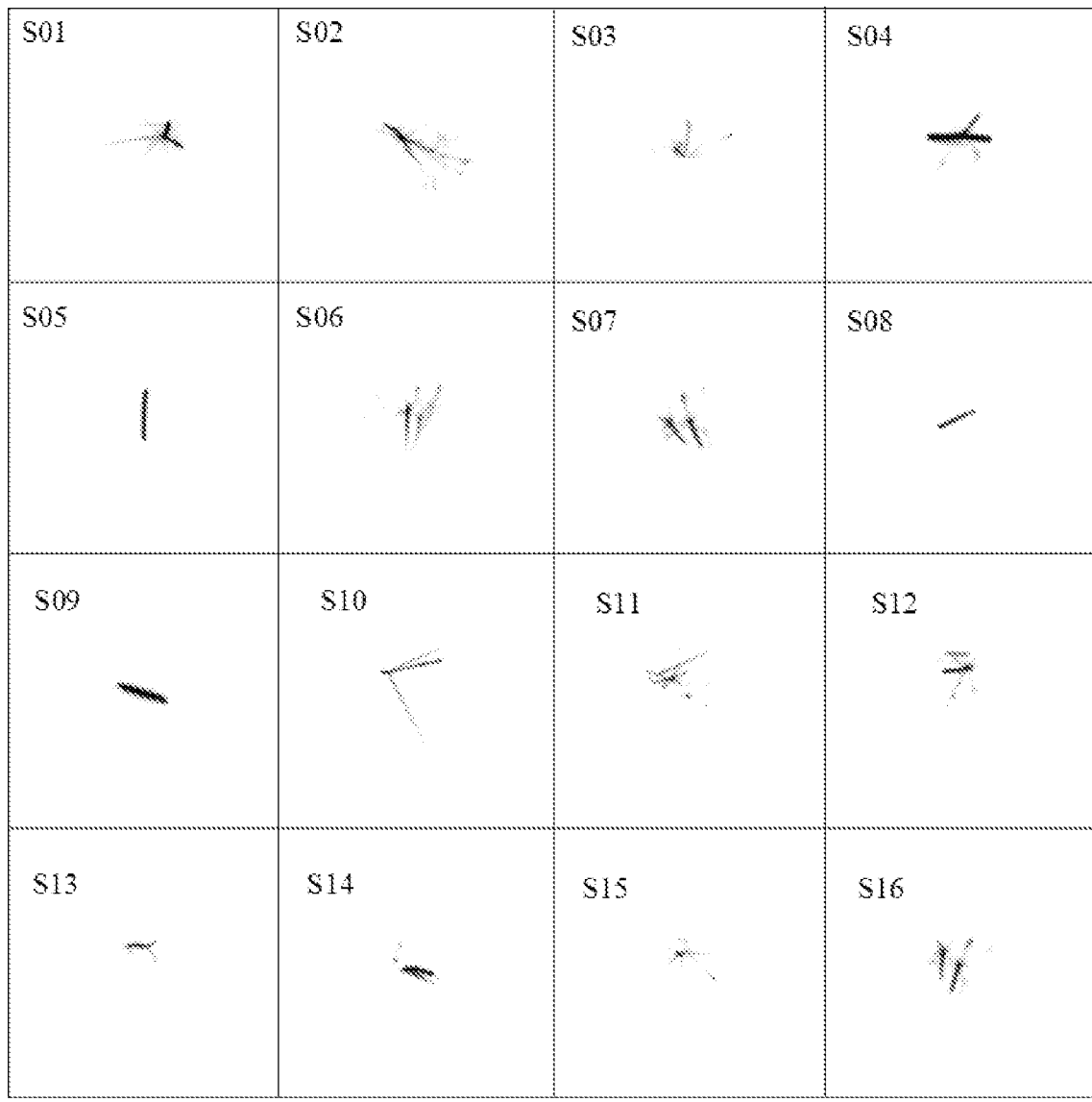
FIG. 2B is a schematic diagram of respective spark particle maps in a spark particle map group provided by at least one embodiment of the present disclosure.

FIG. 2B shows a schematic diagram of respective spark particle maps in the spark particle map group. As shown in FIG. 2B, spark maps may include spark map S01 to spark map S16. When rendering any spark particle, one spark map may be randomly selected from the 16 spark maps for rendering and displaying.

It should be noted that the spark maps are not limited to the situation shown in FIG. 2B; and other spark maps may also be adopted to render the spark particle.

The trail particle set may include a plurality of trail particles; when the visual effect trajectory is determined through the movement of the visual trajectory point, in step S20, the generating a trail particle set in the three-dimension space for obtaining the firework visual effect, based on the visual effect trajectory, includes: mapping the visual trajectory point as a spatial trajectory point in the three-dimension space; determining an extension trajectory according to a movement of the spatial trajectory point in the three-dimension space, wherein the extension trajectory is a trajectory mapped from the visual effect trajectory into the three-dimension space; during a movement of the spatial trajectory point, along the extension trajectory, generating at least one trail particle among the plurality of trail particles within a second range of a position where the spatial trajectory point is located on the extension trajectory every time the spatial trajectory point moves a first distance; and for each trail particle among the plurality of trail particles, setting attribute values of trail particle attributes corresponding to the trail particle, to obtain a plurality of trail particle attribute values, wherein the trail particle attributes comprise any combination of: particle lifetime, particle size, particle color, particle transparency, particle orientation, particle position, particle velocity, and particle rotation angle.

For example, the spatial trajectory point moving a first distance each time may be moving a same distance each time, that is, the first distance is a fixed value at this time; for example, the spatial trajectory point moving a first distance each time may be moving a different distance each time, that is, the first distance is a random value at this time.

For example, every time the spatial trajectory point moves a unit distance, M particles are generated; here, the unit distance is the unit distance in the foregoing virtual three-dimension space, for example, if a scale adopted in the virtual three-dimension space is 1 "meter" in the virtual three-dimension space or a virtual unit distance of other settings (e.g., which is selected as one percent of the width or the length of the virtual three-dimension space), the first distance may be a ratio of the unit distance to M at this time, that is, (1/M) meter, where M is a positive integer greater than or equal to 1. That is to say, with continuous movement of the spatial trajectory point, new particles are continuously generated on the extension trajectory. For example, when the visual effect trajectory is determined according to the movement of the fingertip as the visual trajectory point, the spatial trajectory point may be a mapping point in the virtual three-dimension space when the fingertip is taken as the visual trajectory point; and then according to such a generation mode of trail particle, an effect of the firework trail that moves with the movement of the fingertip may be generated.

In one embodiment, when the visual effect trajectory is a preset trajectory, in step S20, the generating a trail particle set in the three-dimension space for generating the firework visual effect, based on the visual effect trajectory, includes: mapping the visual effect trajectory as an extension trajectory in the three-dimension space; generating the plurality of trail particles at equal separation distances or generating the plurality of trail particles at random separation distances along the extension trajectory, or generating the plurality of trail particles at equal time intervals or generating the plurality of trail particles at random time intervals along the extension trajectory; and for each trail particle among the plurality of trail particles, setting attribute values of trail particle attributes corresponding to the trail particle, to obtain a plurality of trail particle attribute values, wherein the trail particle attributes comprise any combination of: particle lifetime, particle size, particle color, particle transparency, particle orientation, particle position, particle velocity, and particle rotation angle.

For example, the generating a plurality of trail particles at equal separation distances along the extension trajectory, may include: sequentially along the extension trajectory, randomly generating at least one trail particle among the plurality of trail particles within a second range of a second position at a predetermined separation distance.

For example, the second range may be a three-dimension region that includes the second position or the position where the spatial trajectory point is located, for example, the three-dimension region may be a sphere, a cube, a cuboid, an ellipsoid, etc.; for example, the second position or the position where the spatial trajectory point is located may be an arbitrary position in the three-dimension region; for example, the second position or the position where the spatial trajectory point is located may be a center of the sphere, for example, the center of the sphere may be the origin of the virtual three-dimension coordinate system.

In order to form firework trail, at least some trail particle primitive models among the plurality of trail particle primitive models are displayed for at least a preset duration, that is, with respect to the plurality of trail particle primitive models respectively corresponding to the plurality of trail particles generated sequentially along the extension trajectory, at least some trail particle primitive models for visually constituting the firework trail need to be displayed for at least a period of time before disappearing, thereby forming a visually trail effect, for example, the preset duration may be determined according to display needs of the firework trail. For example, in some embodiments, the preset duration is 3 seconds, and for example, in other embodiments, the preset duration may be 10 seconds. In order to obtain a better firework trail visual effect, the preset duration may be set to an appropriate length, for example, the preset duration may be an arbitrary duration greater than 3 seconds.

It should be noted that the preset duration according to the present disclosure defines a lower limit of duration for which the trail particle primitive model needs to be displayed; according to display needs, there may be some trail particle primitive models that need to be displayed for at least a first preset duration, and some trail particle primitive models that need to be displayed for at least a second preset duration; the first preset duration and the second preset duration are different from each other, and at this time, the preset duration may be a minimum value between the first preset duration and the second preset duration.

For example, in order to form the firework trail, the particle lifetime of the trail particle needs to be set greater than or equal to the preset duration, so that the trail particle primitive model corresponding to the trail particle may disappear after the duration set through the particle lifetime attribute, thereby implementing an effect that the trail particle primitive model disappears visually. For example, the particle lifetime of the trail particle may be a random value within a certain range or a fixed value; for example, if the preset duration is 5 seconds, the particle lifetime of the trail particle may be an arbitrary value greater than 5 seconds, for example, 6 seconds or infinitely long.

A particle color corresponding to the trail particle may be an arbitrary color; for example, in some embodiments, an initial value of the particle color corresponding to the trail particle may be white.

For example, in some embodiments, within the particle lifetime of the trail particle, the particle color corresponding to the trail particle remains unchanged; for example, in other embodiments, within the particle lifetime of the trail particle, the particle color corresponding to the trail particle may also change.

The trail particle primitive model set includes a plurality of trail particle primitive models; and step S40 may include: respectively rendering the plurality of trail particles based on the plurality of trail particle attribute values, to obtain a plurality of trail particle primitive models, wherein the firework trail is formed by superimposing the plurality of trail particle primitive models.

For example, in step S40, the respectively rendering the plurality of trail particles based on the plurality of trail particle attribute values, to obtain a plurality of trail particle primitive models, may include: acquiring at least one trail particle map group corresponding to the trail particle set; respectively rendering the plurality of trail particles, based on the at least one trail particle map group and the plurality of trail particle attribute values, to obtain the plurality of trail particle primitive models.

In a particle lifetime of each trail particle, updating the trail particle attribute values corresponding to the trail particle according to the rendering frame rate, and rendering the trail particle based on the updated trail particle attribute values and the corresponding trail particle map group, to obtain a trail particle primitive model corresponding to the trail particle. As such, changes of the trail particle primitive model over time may be simulated.

During the rendering procedure, a trail map corresponding to each trail particle always faces the virtual camera, that is, a position and a direction in which the lens of the virtual camera is located.

During the rendering procedure, the rendering frame rate may be set according to actual situations, for example, the rendering frame rate may be 5 times/second, 10 times/second, etc.

The plurality of trail particles include at least one first trail particle; and the at least one first trail particle is used for generating a trail spark portion in the firework trail, that is, the first trail particle is used for simulating an effect of the firework trail spark portion.

An initial value of a particle size corresponding to the first trail particle may be a random value within a first trail size range; the first trail size range may be set according to actual situations, which will not be limited in the present disclosure.

For example, within a particle lifetime of the first trail particle, the particle size corresponding to the first trail particle may continuously change; for example, the particle size corresponding to the first trail particle rapidly expands from the initial value of the particle size corresponding to the first trail particle to N2 times the initial value of the particle size corresponding to the first trail particle, where N2 is greater than 1; for example, when reaching 10% of the particle lifetime of the first trail particle, the particle size is expanded to N2 times the initial value of the particle size corresponding to the first trail particle, and remains unchanged thereafter. By controlling the particle size, the trail particle primitive model corresponding to the first trail particle is controlled to present a visual effect of rapidly increasing from small to large, and then remaining unchanged.

A particle velocity corresponding to the first trail particle may be an arbitrary value, for example 0, that is, the first trail particle does not move within the particle lifetime thereof.

A particle rotation angle corresponding to the first trail particle may be an arbitrary value, for example, 0. For example, when generating the first trail particle, an angle may be randomly selected from 0 to 360 degrees as an initial value of the particle rotation angle corresponding to the first trail particle. Here, definition of the particle rotation angle is the same as the definition of the particle rotation angle in the firework particle attributes, and no details will be repeated here.

An initial value of particle transparency of the trail particle attribute corresponding to the first trail particle may be an arbitrary value; for example, in some embodiments, the initial value of the particle transparency of the trail particle attribute corresponding to the first trail particle may be 1, that is, completely opaque.

In some embodiments, within the particle lifetime of the first trail particle, the particle transparency corresponding to the first trail particle may change from the first transparency to second transparency and then to third transparency, both the first transparency and the third transparency are different from the second transparency. For example, the first transparency and the third transparency may be the same or different. For example, in some embodiments, both the first transparency and the third transparency are 0, and the second transparency is 1. In this case, both the first transparency and the third transparency are lower than the second transparency, so that the trail particle primitive model corresponding to the first trail particle presents a visual effect of gradually appearing and disappearing.

In some embodiments, both the first transparency and the third transparency are 1, and the second transparency may be 0. In this case, both the first transparency and the third transparency are higher than the second transparency, and the particle primitive model corresponding to the first trail particle presents a visual effect of gradually disappearing and appearing.

In some embodiments, within the particle lifetime of the first trail particle, the particle transparency of the first trail particle undergoes periodic changes, so that the particle primitive model corresponding to the first trail particle visually generates a flickering effect.

In some embodiments, within the particle lifetime of the first trail particle, the particle transparency of the first trail particle undergoes periodic changes starting from the m-th second in the particle lifetime of the first trail particle, where m is a positive number, so that the particle primitive model corresponding to the first trail particle visually presents an effect of starting to flicker from the m-th second after birth.

The above-described changes in particle transparency may be combined arbitrarily to obtain richer visual effects.

The trail particle map group includes a first trail map group; the first trail map group includes a plurality of first trail maps that are different from each other; within a particle lifetime of each first trail particle, switching a plurality of first trail maps according to the first frequency, for rendering each first trail particle, so as to obtain a trail particle primitive model corresponding to each first trail particle.

In the present disclosure, the rendering mode of the first trail particle is a patch model, that is, each first trail particle is rendered in a form of a patch model combined with a specific material; for example, the patch model may be a triangular patch model.

The first frequency may be Q2 times per second. For example, if the particle lifetime of the first trail particle is 1 second, and the rendering frame rate is Q2 times/second, then Q2 renderings will be performed within the particle lifetime of the first trail particle, and the first trail map used for rendering needs to be switched during each rendering. A specific value of Q2 may be selected according to actual effects, which will not be limited here.

Figure 2C:
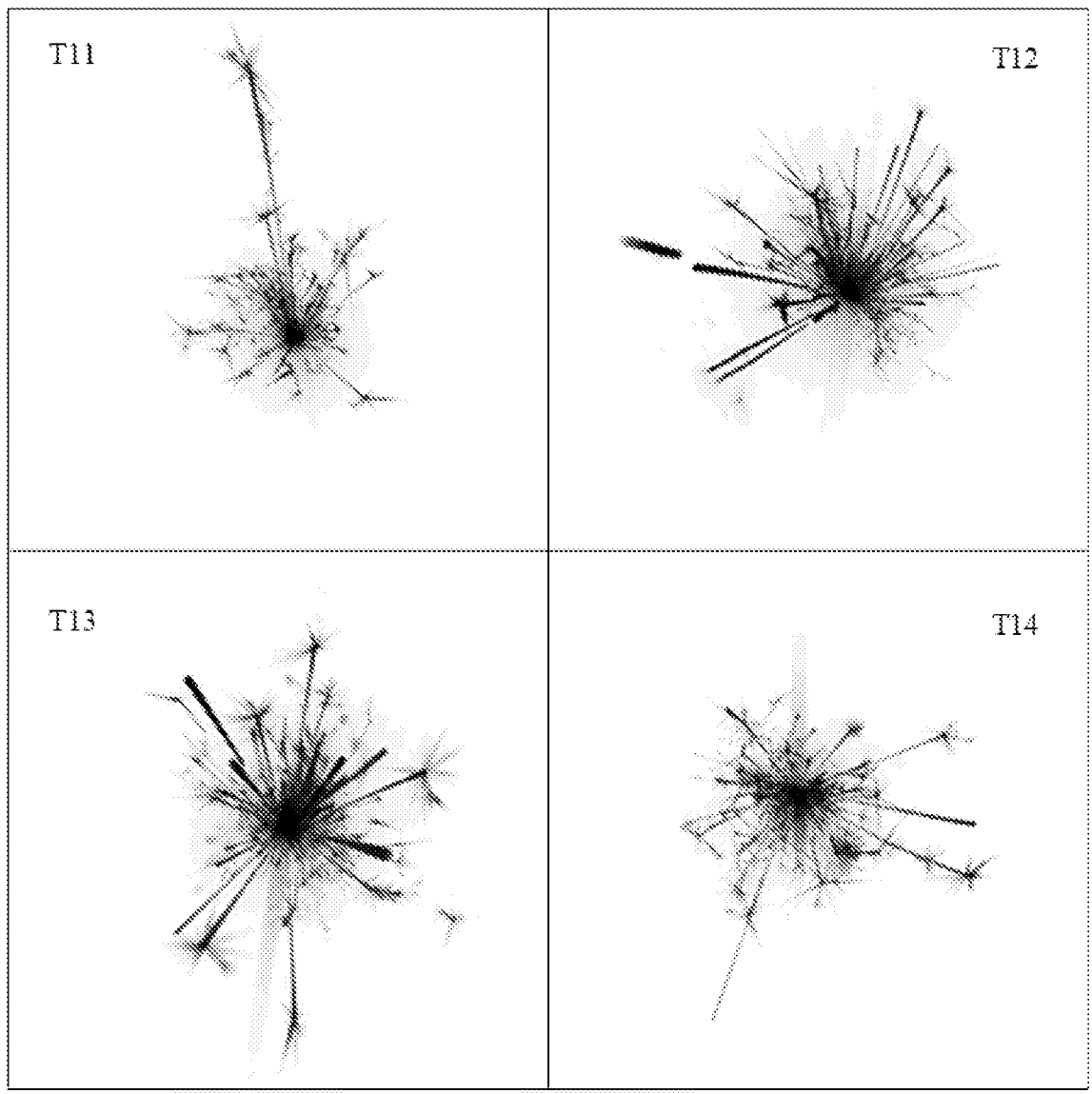
FIG. 2C is a schematic diagram of respective first trail maps in a first trail map group provided by at least one embodiment of the present disclosure.

For example, FIG. 2C shows respective first trail maps in the first trail map group provided by at least one embodiment of the present disclosure. As shown in FIG. 2C, the first trail map may include a first trail map T11, a first trail map T12, a first trail map T13, and a first trail map T14.

For example, with respect to the first trail particle, in the initialization stage, a first trail map may be randomly selected from a plurality of first trail maps for rendering and displaying; and then, within the particle lifetime of the first trail particle, the first trail map used for rendering may be randomly or sequentially switched according to the switching frequency.

For example, with respect to the 4 first trail maps shown in FIG. 2C, when a certain first trail particle is subjected to multiple renderings, during a first rendering, the first trail map T11 is used for rendering; then, during a second rendering, if the map needs to be switched, the first trail map T12 may be used for rendering; then, during a third rendering, if the map needs to be switched, the first trail map T13 may be used for rendering; then, during a fourth rendering, if the map needs to be switched, the first trail map T14 may be used for rendering; then, during a fifth rendering, if the map needs to be switched, the first trail map T11 may be used for rendering; then, during a sixth rendering, if the map needs to be switched, the first trail map T12 may be used for rendering, and so on.

It should be noted that the first trail map is not limited to the situation shown in FIG. 2C, and more or other first trail maps may also be adopted to render the first trail particles.

The plurality of trail particles further include at least one strip particle; the at least one strip particle is used for generating a strip portion in the firework trail, that is, the strip particle is used for generating an elongated foundation trajectory in the firework trail.

With respect to the strip particle, a particle rendering mode different from the foregoing method, that is, a strip mode, may be adopted to render the strip particle, so as to obtain an elongated ribbon model generated along the extension trajectory; and the ribbon model is rendered in combination with a specific model material, to obtain the elongated foundation trajectory in the firework trail that is formed along the visual effect trajectory.

At least one trail particle map group further includes a strip map group; the strip map group includes at least one strip particle map; in step S40, the respectively rendering the plurality of trail particles based on the at least one trail particle map group and the plurality of trail particle attribute values, to obtain a plurality of trail particle primitive models, may include: generating at least one patch model in one-to-one correspondence with the at least one strip particle, based on the at least one strip particle and attribute values of trail particle attributes corresponding to the at least one strip particle; splicing the at least one patch model into a ribbon model; rendering the ribbon model based on the at least one strip particle map, to obtain a strip particle primitive model, wherein the plurality of trail particle primitive models comprise the strip particle primitive model, and the strip portion is formed by the strip particle primitive model.

During the above rendering procedure, with respect to any strip particle, a patch model is generated according to the updated attribute values of the trail particle attributes corresponding to the any strip particle; the patch model has a visual form determined by the updated attribute values of the trail particle attributes corresponding to the any strip particle; for example, a size of the patch model is determined by an attribute value of the particle size of the strip particle, transparency of the patch model is determined by an attribute value of the particle transparency of the strip particle, and so on; thereafter, the newly generated patch model is spliced with other patch models generated before the newly generated patch model to form a ribbon model; the ribbon model is rendered based on the at least one strip particle map, to obtain the strip particle primitive model. In such a rendering mode, the ribbon model may be generated in real time, making rendering more flexible.

Figure 2D:
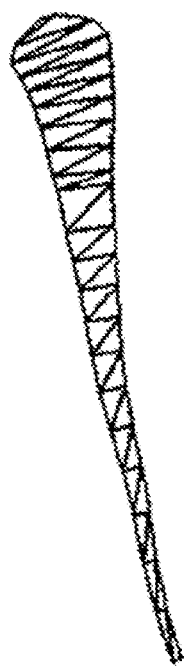
FIG. 2D is a wireframe schematic diagram of a ribbon model provided by an embodiment of the present disclosure.

FIG. 2D is a wireframe schematic diagram of a ribbon model provided by an embodiment of the present disclosure; and it may be seen that the ribbon model may be formed by splicing a plurality of triangular patch models together.

In other embodiments, a preset ribbon model may be generated in advance; before generating the firework trail, the preset ribbon model is compressed into a point in the virtual three-dimension space, and then gradually unfolds with movement of the spatial trajectory point, or gradually unfolds along the preset extension trajectory, forming a trail visual effect.

For example, in step S40, the respectively rendering the plurality of trail particles based on the at least one trail particle map group and the plurality of trail particle attribute values, to obtain a plurality of trail particle primitive models, may include: acquiring a preset ribbon model, wherein the preset ribbon model comprises a plurality of patch models; adjusting the plurality of patch models of the preset ribbon model, based on the at least one strip particle and attribute values of trail particle attributes corresponding to the at least one strip particle; distributing the plurality of patch models of the adjusted preset ribbon model onto the extension trajectory; rendering the adjusted preset ribbon model based on the at least one strip particle map, to obtain the strip particle primitive model, wherein the plurality of trail particle primitive models comprise the strip particle primitive model, and the strip portion is formed by the strip particle primitive model.

In such a rendering procedure, firstly, a preset ribbon model generated in advance is acquired, the preset ribbon model includes P patch models, each patch model corresponds to a strip particle, where P is a positive integer; then, during the generation and update procedures of the strip particle, a patch model corresponding to the strip particle is adjusted based on the attribute values of the trail particle attributes corresponding to the strip particle; next, the adjusted preset ribbon model is distributed on the extension trajectory where the trail particle is located, meanwhile, a length of the preset ribbon model is adjusted according to a length change of the extension trajectory, while keeping a width of the preset ribbon model within a preset width range, that is to say, the length of the preset ribbon model may continuously extend with the movement of the spatial trajectory point, or, the length of the preset ribbon model may continuously extend along the preset extension trajectory. Such a rendering mode does not require real-time generation of the patch model, which, thus, is capable of reducing resource consumption of the electronic device.

An initial value of particle transparency corresponding to the strip particle may be an arbitrary value; for example, in some embodiments, the initial value of the particle transparency corresponding to the strip particle may be 1, that is, completely opaque.

In some embodiments, within the particle lifetime of the strip particle, the particle transparency does not change.

Figure 2E:
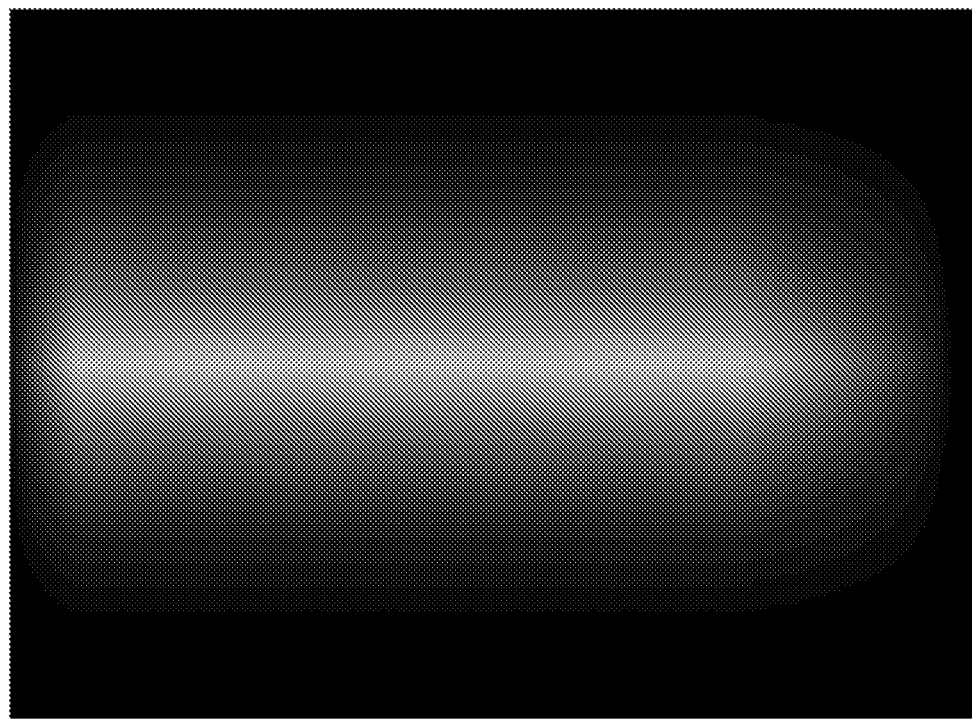
FIG. 2E is a schematic diagram of a strip particle map provided by an embodiment of the present disclosure.

For example, FIG. 2E is a schematic diagram of a strip particle map provided by an embodiment of the present disclosure; by adopting the strip particle map shown in FIG. 2E to render the ribbon model, a strip with transparency transitioning from opaque to transparent along a direction from a strip center to a strip edge may be obtained; and the strip is taken as the strip portion of the firework trail.

Taking the spatial trajectory point as a mapping point in the virtual three-dimension space when using a fingertip as the visual trajectory point, according to the generation and rendering mode of strip particles, the movement trajectory of fingertip may be displayed on the display screen in a strip mode with the waving of fingertip.

The firework trail may further include a debris portion, the debris portion is used for presenting debris flying from the firework trail, reflecting scattered sparks during the firework discharge process, in order to obtain a richer visual effect. For example, the plurality of trail particles further include at least one second trail particle; and the at least one second trail particle is used for generating a debris portion in the firework trail that moves along a path away from the trail spark portion.

In step S20, the generating a trail particle set in the three-dimension space for generating the firework visual effect, based on the visual effect trajectory, may further include: in response to generating any first trail particle in the at least one first trail particle; determining an initial position of any first trail particle; and generating a second trail particle corresponding to the any first trail particle in the at least one second trail particle that, within a third range of the initial position and within the preset generation time period.

For example, the third range may be a three-dimension region that includes the initial position, for example, the three-dimension region may be a sphere, a cube, a cuboid, an ellipsoid, etc.; for example, the initial position may be any position in the three-dimension region, for example, the initial position is a center of the sphere; for example, the center of the sphere may be an origin of the virtual three-dimension coordinate system.

Every time a first trail particle is generated, within n seconds from birth of the first trail particle, generating a second trail particle corresponding to the first trail particle at a second generation rate, within the third range of the initial position where the first trail particle is located.

For example, the second generation rate represents a rate at which the second trail particle is generated, that is, the second trail particle in the trail particle set may be generated at a fixed second generation rate; for example, the second generation rate may be S2 second trail particles per second. For example, in some embodiments, the generating S2 second trail particles per second may represent: generating one second trail particle every other 1/(S2) second. A specific value of S2 may be selected according to actual effects, which will not be limited here.

An initial value of a particle size corresponding to the second trail particle may be a random value within a second trail size range; and the second trail size range may be set according to actual situations, which will not be limited in the present disclosure.

Within a particle lifetime of the second trail particle, the particle size corresponding to the second trail particle may remain unchanged.

A particle color corresponding to the second trail particle may be an arbitrary color; for example, in some embodiments, an initial value of the particle color corresponding to the second trail particle may be orange red.

Within the particle lifetime of the second trail particle, the particle color corresponding to the second trail particle may remain unchanged.

A particle rotation angle corresponding to the second trail particle may be an arbitrary value; when generating the second trail particle, an angle may be randomly selected from 0 to 360 degrees as an initial value of the particle rotation angle corresponding to the second trail particle. Here, definition of the particle rotation angle is the same as the definition of the particle rotation angle in the firework particle attributes, and no details will be repeated here.

An initial value of particle transparency corresponding to the second trail particle may be an arbitrary value; for example, in some embodiments, the initial value of the particle transparency corresponding to the second trail particle may be first transparency, for example, the first transparency is 0, that is, completely transparent.

Within the particle lifetime of the second trail particle, the attribute value of the particle transparency corresponding to the second trail particle may change from the first transparency to the second transparency and then to the third transparency; both the first transparency and the third transparency are lower than the second transparency, so that the trail particle primitive model corresponding to the second trail particle presents a visual effect of gradually appearing and disappearing.

An initial value of a particle velocity corresponding to the second trail particle may be an arbitrary value within the preset velocity range, that is, the second trail particle may move within the particle lifetime thereof.

Within the particle lifetime of the second trail particle, a movement trajectory and a movement velocity of the second trail particle may be related to gravity or resistance, that is to say, it may be seen that there is spark debris flying near the firework trail in the three-dimension space on a visual effect.

In addition, in order to demonstrate the effect of spark debris flying, the particle lifetime of the second trail particle may be set relatively short; for example, a particle lifetime in the trail particle attributes may be a fixed value or a random value within a second lifetime range, which will not be limited in the present disclosure. For example, the particle lifetime of the second trail particle may be shorter than the preset duration, but longer than the particle lifetime of the spark particle.

Correspondingly, the at least one trail particle map group further includes a second trail map group; the second trail map group includes a plurality of second trail maps that are different from each other. Within the particle lifetime of the second trail particle, the second trail map used for rendering the second trail particle may remain unchanged. The present disclosure is not limited thereto; within the particle lifetime of the second trail particle, the plurality of second trail maps may also be randomly or sequentially switched according to a preset switching frequency, for rendering a visual effect of the second trail particle.

For example, with respect to each second trail particle, randomly selecting a second trail map from the plurality of second trail maps for rendering the second trail particle, to obtain a trail particle primitive model corresponding to the second trail particle.

For example, the second trail map group may be as shown in FIG. 2B, and the second trail map may include map S01 to map S16 in FIG. 2B; when rendering any second trail particle, one of the 16 trail maps may be randomly selected as the second trail map for rendering and displaying.

It should be noted that the second trail map is not limited to the situation shown in FIG. 2B, and other second trail maps may also be adopted to render the second trail particle.

For example, a particle lifetime of any firework particle in the firework particle set is shorter than a particle lifetime of any trail particle in the trail particle set, so as to present an effect that the firework trail may still display for a period of time after the firework center moves.

The GPU particle technology is more suitable for a scenario of generating and using a large number of particles, and the CPU particle technology has more advantages in combining with physical systems than the GPU particle technology, so in the present disclosure, the first trail particle and the second trail particle in the firework particle set and the trail particle set may be generated by using the GPU particle technology, and the strip particle in the trail particle set may be generated by using the CPU particle technology.

The firework visual effect represents a visual effect formed by superimposing the visual effects corresponding to the respective central particle primitive models and the visual effects corresponding to the respective spark particle primitive models.

Step S50 may include: overlapping the plurality of firework particle primitive models with the plurality of trail particle primitive models, based on the positional relationship between the plurality of firework particles and the plurality of trail particles, to generate the firework visual effect.

For example, the overlapping the plurality of firework particle primitive models with the plurality of trail particle primitive models, to generate the firework visual effect, may include: respectively superimposing pixel values located in a same position in the plurality of firework particle primitive models and the plurality of trail particle primitive models, to generate the firework visual effect.

In one embodiment, the determining a visual trajectory point may include: acquiring a video to be processed; detecting a target object in the video to be processed; recognizing a feature point on the target object, and taking the feature point as the visual trajectory point.

The video to be processed may be a video captured in real time or a video pre-captured and stored. For example, when a generating method of the video is applied to an application of the electronic device, the video to be processed may be either a video stored in the electronic device or a video captured in real time by the user; at this time, if the firework visual effect is implement by the electronic device per se, the electronic device may process the video to be processed in real time; if the firework visual effect is implemented by the server, the video stored in the electronic device or the video captured in real time is uploaded to the server through the network, subjected to trail characteristics processing by the server, and then is returned to the electronic device. In addition, the user may also upload the generated video from the electronic device to the server through the network, so as to send the same to other users or publishing the same to the public.

According to different configurations of different electronic devices, users may trigger video capture events be means such as physical buttons, displayed touch buttons, voice control, etc.

For example, a user may click on a video capture button on the touch display screen to start capturing the video to be processed in real time.

For example, the video capture event may be controlled by the user through voice; and triggering conditions for capture will not be limited in the present disclosure.

In one embodiment, the target object is a hand; the feature point is a fingertip of the hand; and the firework visual effect is displayed at a movement trajectory of the fingertip. For example, the fingertip may be an index fingertip, etc. For example, the electronic device may adopt an AR technology, to display the generated firework visual effect at the movement trajectory of the fingertip in a superimposed manner.

In some embodiments, when the visual effect trajectory is a trajectory determined according to movement of the fingertip of the user, the user may trigger a video capture event in various ways; when the captured video includes the fingertip of the user, the firework visual effect may be formed on the display screen with movement of the fingertip. In the firework visual effect, the firework center is located in a position where the fingertip is located, and moves with movement of the fingertip; and the firework trail is displayed on the display screen with movement of the fingertip.

When the feature point moves out of the display screen on which the video to be processed is displayed, for example, if the feature point is the fingertip, then when the fingertip moves out of the display screen, by adjusting the attribute values of the trail particle corresponding to the trail particle primitive model, a visual effect that the firework trail gradually disappears along the visual effect trajectory from a start position of the firework trail is presented.

With respect to at least some particle primitive models that visually constitute the firework trail, the particle primitive model may be made disappear visually by adjusting the particle lifetime or adjusting transparency.

In response to the feature point moving out of the video to be processed, according to an order in which the plurality of trail particles are generated, sequentially adjusting particle lifetimes of at least some trail particles corresponding to the at least some trail particle primitive models, or sequentially adjusting transparency of the at least some trail particle primitive models to fully transparent, so as to make the firework trail gradually disappear.

For example, according to the order in which the plurality of trail particles are generated, the particle lifetimes of the trail particles corresponding to the at least some trail particle primitive models are adjusted sequentially to the existing time of the trail particles, so that the trail particles directly die out; or, the particle lifetimes of the trail particles corresponding to at least some trail particle primitive models are adjusted sequentially to a sum of the existing time of the trail particles and a first time interval, so that the trail particles sequentially die out after the first time interval.

According to the order in which the plurality of trail particles are generated, attribute value of the particle transparency of trail particles corresponding to the at least some trail particle primitive models are adjusted sequentially to 0, that is, the trail particle primitive models are caused to present a completely transparent state. For example, according to a chronological order, a trail particle generated firstly is adjusted firstly, for example, trail particle A, trail particle B, trail particle C and other trail particles are generated sequentially along the extension trajectory; firstly, transparency of a trail particle primitive model corresponding to trail particle A is adjusted to be completely transparent, then the transparency of a trail particle primitive model corresponding to trail particle B is adjusted to be completely transparent, then the transparency of a trail particle primitive model corresponding to trail particle C is adjusted to be completely transparent, and so on. Moreover, adjustment time intervals between two adjacent trail particles may be equal, for example, particle transparency of trail particles is adjusted sequentially at every second time interval.

The method for generating the firework visual effect further includes: superimposing the firework visual effect in the video to be processed, to generate a video having the firework visual effect.

Figure 3:
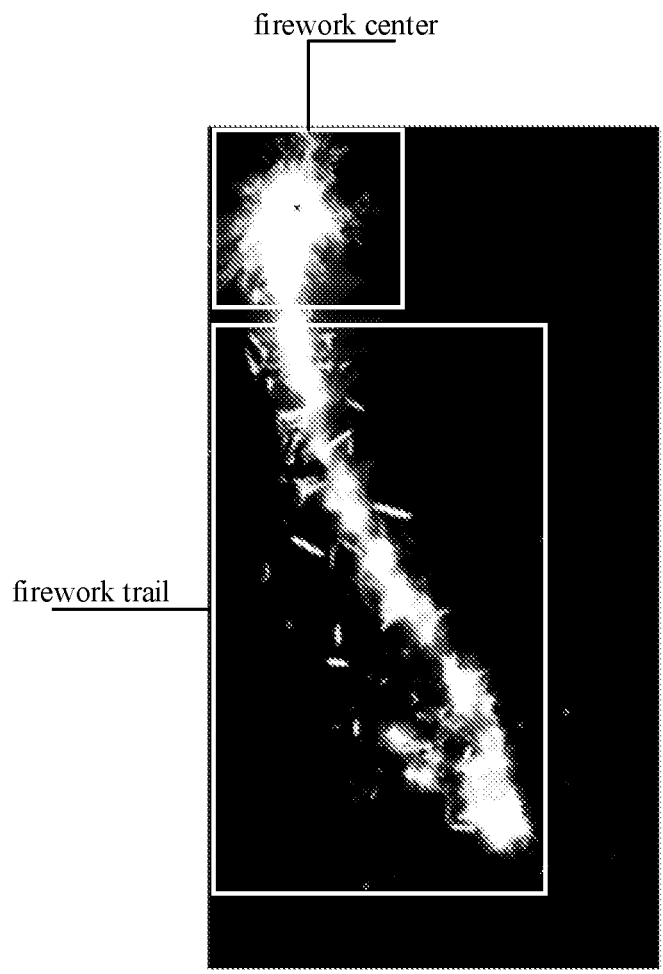
FIG. 3 is a schematic diagram of a firework visual effect provided by an embodiment of the present disclosure.

FIG. 3 is a schematic diagram of a firework visual effect provided by an embodiment of the present disclosure. As shown in FIG. 3, two rectangular boxes indicate a firework center and a firework trail included in the firework visual effect. The firework center includes a circular central portion and a spark portion flying in a direction away from the central portion; the firework trail includes a strip portion as a foundation trajectory, a trail spark portion used for simulating continuous discharge of firework on the strip portion, and a debris portion flying out of the firework trail.

In the method for generating the firework visual effect provided by the embodiment of the present disclosure, the generated firework visual effect may be superimposed into the video to be processed, to meet application requirements of various scenarios. For example, when combining AR and the target object tracking detection technology, real-time tracking of target object movement may be implemented, to simulate a visual effect of a firework trajectory in real-world time-lapse photography works.

Hereinafter, an execution procedure of a method for generating a firework visual effect provided by an embodiment of the present disclosure will be schematically illustrated in conjunction with AR and a hand tracking detection technology.

For example, when a video capture event is detected, the video to be processed is collected in real time, the user triggers the video capture event in a same way as described above, and no details will be repeated here.

Taking that the target object includes the user's hand in the video as an example, during a collection procedure of the video to be processed, the user's index finger tip on the display screen may be recognized in real time by using a hand recognizing method, the user's index fingertip is taken as a visual trajectory point, the firework visual effect is generated and displayed on the display screen along a movement trajectory of the user's index fingertip, the firework center always follows movement of the user's index fingertip, and a firework trail is shown along the trajectory the user's index fingertip passes through. In one embodiment, the electronic device may adopt an AR technology, to display the generated firework visual effect at the movement trajectory of the fingertip in a superimposed manner.

For example, at a first moment when the user's index fingertip is located in a first position, the firework center is located in the first position, and the firework trail is generated on the trajectory the user's index fingertip passes through; at a second moment when the user's index fingertip is located in a second position, the firework center is located in the second position, and the firework trail is generated on the trajectory the user's index fingertip passes through, so as to display the trajectory the user's index fingertip passes through with a visual effect of the firework trail, which may improve the user's experience.

When the user's index fingertip moves out of the display screen, the position where the user's index fingertip is located at the beginning of video recording is taken as a tail portion of the firework trail; and along the firework trail, the entire firework visual effect gradually disappears from the tail portion of the firework trail.

In addition, the firework visual effect may also be a trajectory drawn in real time by the user on the display screen, or the firework visual effect may also be preset text, specific graphics, and other trajectories, and present a dynamic firework visual effect in images, dynamic images, or videos acquired.

Figure 4:
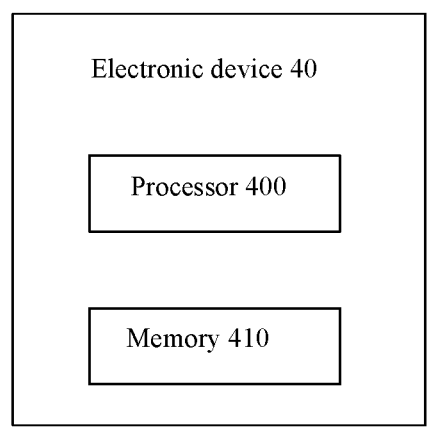
FIG. 4 is a schematic block diagram of an electronic device provided by at least one embodiment of the present disclosure.

Some embodiments of the present disclosure further provide an electronic device. FIG. 4 is a schematic block diagram of an electronic device provided by at least one embodiment of the present disclosure.

For example, as shown in FIG. 4, the electronic device 40 includes a processor 400 and a memory 410. It should be noted that components of the electronic device 40 shown in FIG. 4 are only exemplary and not limitative; and according to practical application needs, the electronic device 40 may further have other components.

For example, the processor 400 and the memory 410 may communicate with each other directly or indirectly.

For example, the processor 400 and the memory 410 may communicate through a network. The network may include a wireless network, a wired network, and/or any combination of the wireless network and the wired network. Mutual communication between the processor 400 and the memory 410 may also be implemented through a system bus, which will not be limited in the present disclosure.

For example, in some embodiments, the memory 410 is configured to store computer-readable instructions in a non-transitory manner. The processor 400 is configured to run the computer-readable instructions; and when run by the processor 400, the computer-readable instructions implement the method for generating the firework visual effect according to any one of the above-described embodiments. The above-described embodiments of the method for generating the firework visual effect may be referred to for specific implementation and related explanations of the respective steps of the method for generating the firework visual effect, and no details will be repeated here.

For example, the processor 400 and the memory 410 may be set on a server side (or a cloud side).

For example, the processor 400 may control other components in the electronic device 40 to execute desired functions. The processor 400 may be a Central Processing Unit (CPU), a Graphics Processing Unit (GPU), a Network Processor (NP), etc.; or may also be a Digital Signal Processor (DSP), an Application Specific Integrated Circuit (ASIC), a Field Programmable Gate Array (FPGA), or other programmable logic device, a discrete gate or a transistor logic device, and a discrete hardware component. The Central Processing Unit (CPU) may be of X86 architecture or ARM architecture, etc.

For example, the memory 410 may include any combination of one or more computer program products; the computer program products may include various forms of computer-readable storage medium, for example, a volatile memory and/or a non-volatile memory. The volatile memory may include, for example, a Random Access Memory (RAM) and/or a cache. The non-volatile memory may include, for example, a Read-Only Memory (ROM), a hard disk, an Erasable Programmable Read-Only Memory (EPROM), a portable Compact Disc Read-Only Memory (CD-ROM), a USB memory, a flash memory, etc. One or more computer-readable instructions may be stored on the computer-readable storage medium; and the processor 400 may run the computer-readable instructions to implement various functions of the electronic device 40. In the storage medium, various applications and data may also be stored.

For example, in some embodiments, the electronic device 40 may be a mobile phone, a tablet personal computer, an electronic paper, a television, a monitor, a laptop, a digital photo frame, a navigator, a wearable electronic device, a smart home device, etc.

For example, the electronic device 40 may include a display panel; the display panel may be used for displaying the firework visual effect and a video superimposed with the firework visual effect, etc. For example, the display panel may be a rectangular panel, a circular panel, an elliptical panel, or a polygonal panel. In addition, the display panel may be not only a flat panel, but may also a curved panel, or even a spherical panel.

For example, the electronic device 40 may have a touch function, that is, the electronic device 40 may be a touch apparatus.

For example, the relevant description in the embodiments of the method for generating the firework visual effect may be referred to for detailed explanation of the procedure of the electronic device 40 executing the method for generating the firework visual effect, and no details will be repeated here.

Figure 5:
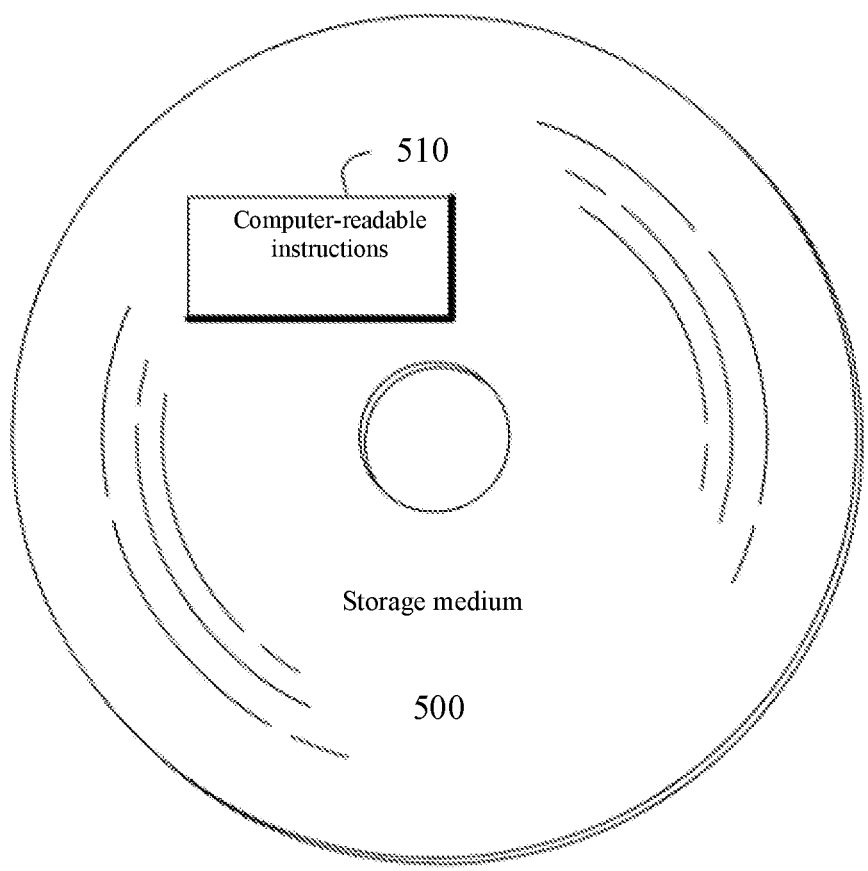
FIG. 5 is a schematic diagram of a non-transitory computer-readable storage medium provided by at least one embodiment of the present disclosure.

FIG. 5 is a schematic diagram of a non-transitory computer-readable storage medium provided by at least one embodiment of the present disclosure. For example, as shown in FIG. 5, one or more computer-readable instructions 510 may be stored on a storage medium 500 in a non-temporary manner. For example, when executed by the processor, the computer-readable instruction 510 may execute one or more steps in the method for generating the firework visual effect as described above.

For example, the storage medium 500 may be applied to the above-described electronic device 40. For example, the storage medium 500 may include a memory 410 in the electronic device 40.

For example, the description of the memory 410 according to the embodiment of the electronic device 40 may be referred to for description of the storage medium 500, and no details will be repeated here.

Figure 6:
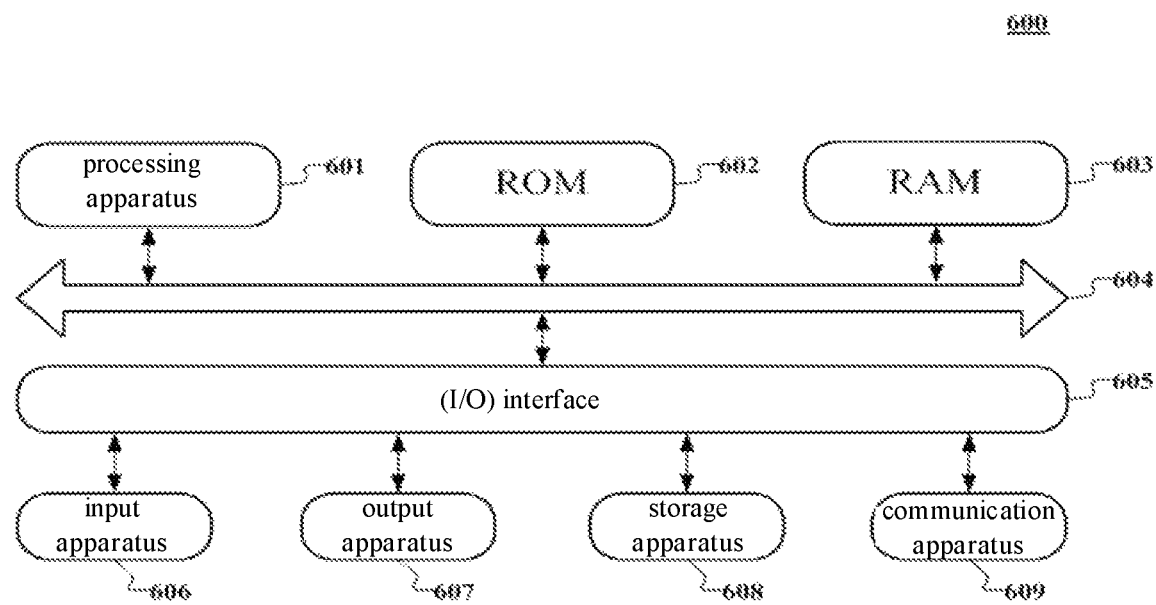
FIG. 6 is a structural schematic diagram of another electronic device provided by at least one embodiment of the present disclosure.

Referring to FIG. 6 below, FIG. 6 shows a structural schematic diagram of an electronic device 600 suitable for implementing the embodiment of the present disclosure (e.g., the electronic device may include the display device as described in the above-described embodiment). The electronic device according to the embodiment of the present disclosure may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), a wearable electronic device, etc., and a stationary terminal such as a digital TV, a desktop computer, a smart home device, etc. The electronic device shown in FIG. 6 is only an example, and should not impose any limitations on the functions and scope of use of the embodiments of the present disclosure.

As shown in FIG. 6, the electronic device 600 may include a processing apparatus (e.g., a central processing unit, a graphics processor, etc.) 601, which may executes various appropriate actions and processing according to a program stored in a Read-Only Memory (ROM) 602 or a program loaded from a storage apparatus 606 into a Random Access Memory (RAM) 603, to execute one or more steps in the method for generating the firework visual effect as described above. The RAM 603 further stores various programs and data required for operation of the electronic device 600. The processing apparatus 601, the ROM 602, and the RAM 603 are connected with each other through a bus 604. An input/output (I/O) interface 605 is also coupled to the bus 604.

Usually, apparatuses below may be coupled to the I/O interface 605: input apparatuses 606 including, for example, a touch screen, a touch pad, a keyboard, a mouse, a camera, a microphone, an accelerometer, a gyroscope, etc.; output apparatuses 607 including, for example, a Liquid Crystal Display (LCD), a speaker, a vibrator, etc.; storage apparatuses 608 including, for example, a magnetic tape, a hard disk, etc.; and a communication apparatus 609. The communication apparatus 609 may allow the electronic device 600 to perform wireless or wired communication with other device so as to exchange data. Although FIG. 4 shows the electronic device 600 including various apparatuses, it should be understood that, it is not required to implement or have all the apparatuses shown, and the electronic device 600 may alternatively implement or have more or fewer apparatuses.

Specifically, according to the embodiments of the present disclosure, the process described above with reference to a flow chart may be implemented as computer software programs. For example, the embodiments of the present disclosure include a computer program product, including a computer program carried on a non-temporary computer-readable medium, the computer program containing program codes for executing the method shown in the flow chart, to execute one or more steps in the method for generating the firework visual effect as described above. In such embodiments, the computer program may be downloaded and installed from the network via the communication apparatus 609, or installed from the storage apparatus 608, or installed from the ROM 602. When executed by the processing apparatus 601, the computer program may execute the above-described functions defined in the method according to the embodiment of the present disclosure.

It should be noted that, in the context of the present disclosure, the computer-readable medium may be a tangible medium, which may contain or store programs for use by or in combination with an instruction executing system, an apparatus, or a device. The computer-readable medium may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a portable Compact Disc Read-Only Memory (CD-ROM); an optical storage device; a magnetic storage device; or any suitable combination of the above. In the present disclosure, a computer-readable storage medium may be any tangible medium that contains or stores a program that may be used by or in conjunction with an instruction executing system, an apparatus, or a device. Rather, in the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination of the above.

In some implementations, the client and the server may communicate with any network protocol currently known or to be researched and developed in the future such as HyperText Transfer Protocol (HTTP), and may communicate (e.g., via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer-readable medium may be included in the above-described electronic device; or may also exist alone without being assembled into the electronic device.

The computer program codes for executing the operations according to the present disclosure may be written in one or more programming languages or a combination thereof; the above-described programming languages include, but not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a Local Area Network (LAN) or a Wide Area Network (WAN), or the connection may be made to an external computer (e.g., through the Internet using an Internet Service Provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present disclosure may be implemented by software or hardware. Wherein, a name of the unit does not constitute limitation of the unit per se in some cases.

The functions described herein above may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

According to one or more embodiments of the present disclosure, A method for generating a firework visual effect, wherein the firework visual effect comprises a firework center and a firework trail, and the method includes: determining a visual effect trajectory; based on the visual effect trajectory, generating a firework particle set and a trail particle set in a three-dimension space for generating the firework visual effect, wherein the firework particle set is used for generating the firework center, and the trail particle set is used for generating the firework trail; rendering the firework particle set, to obtain a firework particle primitive model set; rendering the trail particle set, to obtain a trail particle primitive model set, wherein the trail particle primitive model set includes a plurality of trail particle primitive models; superimposing the firework particle primitive model set and the trail particle primitive model set, to generate the firework visual effect, wherein at least some trail particle primitive models among the plurality of trail particle primitive models are displayed for at least a preset duration.

According to one or more embodiments of the present disclosure, the determining a visual effect trajectory includes: determining a visual trajectory point; and determining the visual effect trajectory according to a movement of the visual trajectory point.

According to one or more embodiments of the present disclosure, wherein the firework particle set includes a plurality of firework particles, the generating a firework particle set in a three-dimension space for generating the firework visual effect, based on the visual effect trajectory, includes: mapping the visual trajectory point as a spatial trajectory point in the three-dimension space; determining an extension trajectory according to a movement of the spatial trajectory point in the three-dimension space, wherein the extension trajectory is a trajectory mapped from the visual effect trajectory into the three-dimension space; generating the plurality of firework particles along the extension trajectory during the movement of the spatial trajectory point; and for each firework particle among the plurality of firework particles, setting attribute values of firework particle attributes corresponding to the firework particle, to obtain a plurality of firework particle attribute values, wherein the firework particle attributes include any combination of: particle lifetime, particle size, particle color, particle transparency, particle orientation, particle position, particle velocity, and particle rotation angle.

According to one or more embodiments of the present disclosure, the generating the plurality of firework particles along the extension trajectory during a movement of the spatial trajectory point, includes: determining that the space trajectory point moves to a first position in the extension trajectory; and generating at least one firework particle among the plurality of firework particles within a first range of the first position according to a first generation rate.

According to one or more embodiments of the present disclosure, the firework particle set includes a plurality of firework particles, and the visual effect trajectory is a preset trajectory, the generating a firework particle set in a three-dimension space for generating the firework visual effect, based on the visual effect trajectory, includes: mapping the visual effect trajectory as an extension trajectory in the three-dimension space; sequentially selecting any trajectory point on the extension trajectory as a spatial trajectory point along the extension trajectory, and generating at least one firework particle among the plurality of firework particles within a first range of a position where the spatial trajectory point is located according to the first generation rate; and for each firework particle among the plurality of firework particles, setting attribute values of firework particle attributes corresponding to the firework particle, to obtain a plurality of firework particle attribute values, wherein the firework particle attributes include any combination of: particle lifetime, particle size, particle color, particle transparency, particle orientation, particle position, particle velocity, and particle rotation angle.

According to one or more embodiments of the present disclosure, the firework particle primitive model set includes a plurality of firework particle primitive models, the rendering the firework particle set to obtain a firework particle primitive model set, includes: respectively rendering the plurality of firework particles based on the plurality of firework particle attribute values, to obtain the plurality of firework particle primitive models; wherein the firework center is formed by superposing the plurality of fireworks particle primitive models.

According to one or more embodiments of the present disclosure, the respectively rendering the plurality of firework particles based on the plurality of firework particle attribute values, to obtain the plurality of firework particle primitive models, includes: for each firework particle: acquiring a firework particle map group corresponding to the firework particle; and rendering the firework particle based on the firework particle map group and attribute values of firework particle attributes corresponding to the firework particle, to obtain a firework particle primitive model corresponding to the firework particle.

According to one or more embodiments of the present disclosure, the plurality of firework particles include at least one central particle, and the at least one central particle is used for generating a central portion of the firework center.

According to one or more embodiments of the present disclosure, the plurality of firework particles further include at least one spark particle, and the at least one spark particle is used for generating a spark portion in the firework center that moves along a path away from the central portion.

According to one or more embodiments of the present disclosure, each firework particle is subjected to a plurality of renderings, and during a process of rendering each firework particle, a firework map adopted has a random rotation angle around a normal of a plane facing a virtual camera used for rendering.

According to one or more embodiments of the present disclosure, the trail particle set includes a plurality of trail particles, the generating a trail particle set in the three-dimension space for obtaining the firework visual effect, based on the visual effect trajectory, includes: mapping the visual trajectory point as a spatial trajectory point in the three-dimension space; determining an extension trajectory according to a movement of the spatial trajectory point in the three-dimension space, wherein the extension trajectory is a trajectory mapped from the visual effect trajectory into the three-dimension space; during a movement of the spatial trajectory point, along the extension trajectory, generating at least one trail particle among the plurality of trail particles within a second range of a position where the spatial trajectory point is located on the extension trajectory every time the spatial trajectory point moves a first distance; and for each trail particle among the plurality of trail particles, setting attribute values of trail particle attributes corresponding to the trail particle, to obtain a plurality of trail particle attribute values, wherein the trail particle attributes include any combination of: particle lifetime, particle size, particle color, particle transparency, particle orientation, particle position, particle velocity, and particle rotation angle.

According to one or more embodiments of the present disclosure, the trail particle set includes a plurality of trail particles, and the visual effect trajectory is a preset trajectory, the generating a trail particle set in the three-dimension space for generating the firework visual effect, based on the visual effect trajectory, includes: mapping the visual effect trajectory as an extension trajectory in the three-dimension space; generating the plurality of trail particles at equal separation distances or generating the plurality of trail particles at random separation distances along the extension trajectory, or generating the plurality of trail particles at equal time intervals or generating the plurality of trail particles at random time intervals along the extension trajectory; and for each trail particle among the plurality of trail particles, setting attribute values of trail particle attributes corresponding to the trail particle, to obtain a plurality of trail particle attribute values, wherein the trail particle attributes include any combination of: particle lifetime, particle size, particle color, particle transparency, particle orientation, particle position, particle velocity, and particle rotation angle.

According to one or more embodiments of the present disclosure, the plurality of trail particles include at least one first trail particle, and the at least one first trail particle is used for generating a trail spark portion in the firework trail, the plurality of trail particles further include at least one second trail particle, and the at least one second trail particle is used for generating a debris portion in the firework trail that moves along a path away from the trail spark portion, the generating a trail particle set in the three-dimension space for generating the firework visual effect, based on the visual effect trajectory, further includes: in response to generating any one first trail particle among the at least one first trail particle: determining an initial position of the any one first trail particle; and generating a second trail particle corresponding to the any one first trail particle in the at least one second trail particle, within a third range of the initial position and within a preset generation time period.

According to one or more embodiments of the present disclosure, the rendering the trail particle set to obtain a trail particle primitive model set, includes: respectively rendering the plurality of trail particles based on the plurality of trail particle attribute values, to obtain the plurality of trail particle primitive models, wherein the firework trail is formed by superimposing the plurality of trail particle primitive models.

According to one or more embodiments of the present disclosure, the respectively rendering the plurality of trail particles based on the plurality of trail particle attribute values, to obtain the plurality of trail particle primitive models, includes: acquiring at least one trail particle map group corresponding to the trail particle set; and respectively rendering the plurality of trail particles, based on the at least one trail particle map group and the plurality of trail particle attribute values, to obtain the plurality of trail particle primitive models.

According to one or more embodiments of the present disclosure, the plurality of trail particles include at least one first trail particle, and the at least one first trail particle is used for generating a trail spark portion in the firework trail, the at least one trail particle map group includes a first trail map group, and the first trail map group includes a plurality of first trail maps that are different from each other; and within a particle lifetime of each first trail particle, switching the plurality of first trail maps according to a first frequency for rendering each first trail particle, so as to obtain a trail particle primitive model corresponding to each first trail particle.

According to one or more embodiments of the present disclosure, the plurality of trail particles further include at least one strip particle, the at least one strip particle is used for generating a strip portion in the firework trail, the at least one trail particle map group further includes a strip map group, the strip map group includes at least one strip particle map; the respectively rendering the plurality of trail particles based on the at least one trail particle map group and the plurality of trail particle attribute values, to obtain the plurality of trail particle primitive models, includes: generating at least one patch model in one-to-one correspondence with the at least one strip particle, based on the at least one strip particle and attribute values of trail particle attributes corresponding to the at least one strip particle; splicing the at least one patch model into a ribbon model; rendering the ribbon model based on the at least one strip particle map, to obtain a strip particle primitive model, wherein the plurality of trail particle primitive models include the strip particle primitive model, and the strip portion is formed by the strip particle primitive model.

According to one or more embodiments of the present disclosure, the plurality of trail particles further include at least one strip particle, the at least one strip particle is used for generating a strip portion in the firework trail, the at least one trail particle map group further includes a strip map group, the strip map group includes at least one strip particle map; the respectively rendering the plurality of trail particles based on the at least one trail particle map group and the plurality of trail particle attribute values, to obtain the plurality of trail particle primitive models, includes: acquiring a preset ribbon model, wherein the preset ribbon model includes a plurality of patch models; adjusting the plurality of patch models of the preset ribbon model, based on the at least one strip particle and attribute values of trail particle attributes corresponding to the at least one strip particle; distributing the plurality of patch models of the adjusted preset ribbon model onto the extension trajectory; rendering the adjusted preset ribbon model based on the at least one strip particle map, to obtain the strip particle primitive model, wherein the plurality of trail particle primitive models include the strip particle primitive model, and the strip portion is formed by the strip particle primitive model.

According to one or more embodiments of the present disclosure, the at least one trail particle map group further includes a second trail map group, and the second trail map group includes a plurality of second trail maps that are different from each other, for each second trail particle, randomly selecting a second trail map from the plurality of second trail maps for rendering the second trail particle, to obtain a trail particle primitive model corresponding to the second trail particle.

According to one or more embodiments of the present disclosure, a particle lifetime of any firework particle in the firework particle set is shorter than a particle lifetime of any trail particle in the trail particle set.

According to one or more embodiments of the present disclosure, the determining a visual trajectory point, includes: acquiring a video to be processed; detecting a target object in the video to be processed; recognizing a feature point on the target object, and taking the feature point as the visual trajectory point.

According to one or more embodiments of the present disclosure, the target object is a hand, the feature point is a fingertip of the hand; and displaying the firework visual effect at a movement trajectory of the fingertip.

According to one or more embodiments of the present disclosure, the method further includes: in response to the feature point moving out of the video to be processed, according to an order in which the plurality of trail particles are generated, sequentially adjusting particle lifetimes of at least some trail particles corresponding to the at least some trail particle primitive models, or sequentially adjusting transparency of the at least some trail particle primitive models to fully transparent, so as to make the firework trail gradually disappear.

According to one or more embodiments of the present disclosure, the method further includes: superimposing the firework visual effect in the video to be processed, to generate a video having the firework visual effect.

According to one or more embodiments of the present disclosure, an electronic device, comprising: a memory, configured to store computer-executable instructions in a non-transitory manner; and a processor, configured to run computer-executable instructions, wherein the computer-executable instructions, when run by the processor, implement the method for generating the firework visual effect according to any embodiment of the present disclosure.

According to one or more embodiments of the present disclosure, a non-transitory computer-readable storage medium, wherein, the non-transitory computer-readable storage medium stores computer-executable instructions, and when executed by the processor, the computer-executable instructions implement the method for generating the firework visual effect according to any embodiment of the present disclosure.

The above description is only preferred embodiments of the present disclosure and explanation of the applied technical principles. Those skilled in the art should understand that the scope of disclosure involved in the present disclosure is not only limited to the technical solutions formed by the specific combination of the above-described technical features, but also covers other technical solutions formed by an arbitrary combination of the above-described technical features or equivalent features thereof without departing from the above-described disclosure concept. For example, the above-described features and the technical features disclosed in the present disclosure (but not limited thereto) and having similar functions are replaced each other to form a technical solution.

Furthermore, although the respective operations are described in a particular order, this should not be understood as requiring the operations to be executed in the particular order shown or in a sequential order. Under certain circumstances, multitasking and parallel processing may be favorable. Similarly, although the above discussion contains a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

Although the subject matter has been described in terms specific to the structural features and/or method logic actions, it should be understood that the subject matter defined in the appended claims is not necessarily limited to the specific features or actions as described above. On the contrary, the specific features and actions as described above are only examples of implementing the claims.

With respect to the present disclosure, there are some points to be illustrated:

(1) Drawings of the embodiments of the present disclosure only refer to structures related to the embodiments of the present disclosure, and other structures may refer to general design.

(2) In case of no conflict, the embodiments of the present disclosure and the features in the embodiments may be combined with each other to obtain a new embodiment.

The above are only specific embodiments of the present disclosure, but the scope of the embodiment of the present disclosure is not limited thereto, and the scope of the present disclosure should be the scope of the following claims.

What is claimed is:

1. A method for generating a firework visual effect, wherein the firework visual effect comprises a firework center and a firework trail, and the method comprises:
   determining a visual effect trajectory;
   based on the visual effect trajectory, generating a firework particle set and a trail particle set in a three-dimension space for generating the firework visual effect, wherein the firework particle set is used for generating the firework center, and the trail particle set is used for generating the firework trail;
   rendering the firework particle set, to obtain a firework particle primitive model set;
   rendering the trail particle set, to obtain a trail particle primitive model set, wherein the trail particle primitive model set comprises a plurality of trail particle primitive models;
   superimposing the firework particle primitive model set and the trail particle primitive model set, to generate the firework visual effect,
   wherein at least some trail particle primitive models among the plurality of trail particle primitive models are displayed for at least a preset duration;
   wherein the determining a visual effect trajectory comprises:
   determining a visual trajectory point; and
   determining the visual effect trajectory according to a movement of the visual trajectory point;
   wherein the determining a visual trajectory point, comprises:
   acquiring a video to be processed;
   detecting a target object in the video to be processed;
   recognizing a feature point on the target object, and taking the feature point as the visual trajectory point;
   wherein the method further comprises:
   in response to the feature point moving out of the video to be processed, according to an order in which the plurality of trail particles are generated, sequentially adjusting particle lifetimes of at least some trail particles corresponding to the at least some trail particle primitive models, or sequentially adjusting transparency of the at least some trail particle primitive models to fully transparent, so as to make the firework trail gradually disappear.

2. The method according to claim 1, wherein the firework particle set comprises a plurality of firework particles,
   the generating a firework particle set in a three-dimension space for generating the firework visual effect, based on the visual effect trajectory, comprises:
   mapping the visual trajectory point as a spatial trajectory point in the three-dimension space;
   determining an extension trajectory according to a movement of the spatial trajectory point in the three-dimension space, wherein the extension trajectory is a trajectory mapped from the visual effect trajectory into the three-dimension space;
   generating the plurality of firework particles along the extension trajectory during the movement of the spatial trajectory point; and
   for each firework particle among the plurality of firework particles, setting attribute values of firework particle attributes corresponding to the firework particle, to obtain a plurality of firework particle attribute values,
   wherein the firework particle attributes comprise any combination of: particle lifetime, particle size, particle color, particle transparency, particle orientation, particle position, particle velocity, and particle rotation angle.

3. The method according to claim 1, wherein the firework particle set comprises a plurality of firework particles, and the visual effect trajectory is a preset trajectory, the generating a firework particle set in a three-dimension space for generating the firework visual effect, based on the visual effect trajectory, comprises:
   mapping the visual effect trajectory as an extension trajectory in the three-dimension space;
   sequentially selecting any trajectory point on the extension trajectory as a spatial trajectory point along the extension trajectory, and generating at least one firework particle among the plurality of firework particles within a first range of a position where the spatial trajectory point is located according to a first generation rate; and
   for each firework particle among the plurality of firework particles, setting attribute values of firework particle attributes corresponding to the firework particle, to obtain a plurality of firework particle attribute values,
   wherein the firework particle attributes comprise any combination of: particle lifetime, particle size, particle color, particle transparency, particle orientation, particle position, particle velocity, and particle rotation angle.

4. The method according to claim 2, wherein the plurality of firework particles comprise at least one central particle, and the at least one central particle is used for generating a central portion of the firework center.

5. The method according to claim 4, wherein the plurality of firework particles further comprise at least one spark particle, and
   the at least one spark particle is used for generating a spark portion in the firework center that moves along a path away from the central portion.

6. The method according to claim 1, wherein the trail particle set comprises a plurality of trail particles,
   the generating a trail particle set in the three-dimension space for obtaining the firework visual effect, based on the visual effect trajectory, comprises:
   mapping the visual trajectory point as a spatial trajectory point in the three-dimension space;
   determining an extension trajectory according to a movement of the spatial trajectory point in the three-dimension space, wherein the extension trajectory is a trajectory mapped from the visual effect trajectory into the three-dimension space;
   during a movement of the spatial trajectory point, along the extension trajectory, generating at least one trail particle among the plurality of trail particles within a second range of a position where the spatial trajectory point is located on the extension trajectory every time the spatial trajectory point moves a first distance; and
   for each trail particle among the plurality of trail particles, setting attribute values of trail particle attributes corresponding to the trail particle, to obtain a plurality of trail particle attribute values,
   wherein the trail particle attributes comprise any combination of: particle lifetime, particle size, particle color, particle transparency, particle orientation, particle position, particle velocity, and particle rotation angle.

7. The method according to claim 1, wherein the trail particle set comprises a plurality of trail particles, and the visual effect trajectory is a preset trajectory, the generating a trail particle set in the three-dimension space for generating the firework visual effect, based on the visual effect trajectory, comprises:
- mapping the visual effect trajectory as an extension trajectory in the three-dimension space;
- generating the plurality of trail particles at equal separation distances or generating the plurality of trail particles at random separation distances along the extension trajectory, or generating the plurality of trail particles at equal time intervals or generating the plurality of trail particles at random time intervals along the extension trajectory; and
- for each trail particle among the plurality of trail particles, setting attribute values of trail particle attributes corresponding to the trail particle, to obtain a plurality of trail particle attribute values,
- wherein the trail particle attributes comprise any combination of: particle lifetime, particle size, particle color, particle transparency, particle orientation, particle position, particle velocity, and particle rotation angle.

8. The method according to claim 6, wherein the plurality of trail particles comprise at least one first trail particle, and the at least one first trail particle is used for generating a trail spark portion in the firework trail,
- the plurality of trail particles further comprise at least one second trail particle, and the at least one second trail particle is used for generating a debris portion in the firework trail that moves along a path away from the trail spark portion,
- the generating a trail particle set in the three-dimension space for generating the firework visual effect, based on the visual effect trajectory, further comprises:
- in response to generating any one first trail particle among the at least one first trail particle:
- determining an initial position of the any one first trail particle; and
- generating a second trail particle corresponding to the any one first trail particle in the at least one second trail particle, within a third range of the initial position and within a preset generation time period.

9. The method according to claim 6, wherein the rendering the trail particle set to obtain a trail particle primitive model set, comprises:
- respectively rendering the plurality of trail particles based on the plurality of trail particle attribute values, to obtain the plurality of trail particle primitive models,
- wherein the firework trail is formed by superimposing the plurality of trail particle primitive models.

10. The method according to claim 9, wherein the respectively rendering the plurality of trail particles based on the plurality of trail particle attribute values, to obtain the plurality of trail particle primitive models, comprises:
- acquiring at least one trail particle map group corresponding to the trail particle set; and
- respectively rendering the plurality of trail particles, based on the at least one trail particle map group and the plurality of trail particle attribute values, to obtain the plurality of trail particle primitive models.

11. The method according to claim 10, wherein the plurality of trail particles comprise at least one first trail particle, and the at least one first trail particle is used for generating a trail spark portion in the firework trail,
- the at least one trail particle map group comprises a first trail map group, and the first trail map group comprises a plurality of first trail maps that are different from each other; and
- within a particle lifetime of each first trail particle, switching the plurality of first trail maps according to a first frequency for rendering each first trail particle, so as to obtain a trail particle primitive model corresponding to each first trail particle.

12. The method according to claim 10, wherein the plurality of trail particles further comprise at least one strip particle, the at least one strip particle is used for generating a strip portion in the firework trail,
- the at least one trail particle map group further comprises a strip map group, the strip map group comprises at least one strip particle map;
- the respectively rendering the plurality of trail particles based on the at least one trail particle map group and the plurality of trail particle attribute values, to obtain the plurality of trail particle primitive models, comprises:
- generating at least one patch model in one-to-one correspondence with the at least one strip particle, based on the at least one strip particle and attribute values of trail particle attributes corresponding to the at least one strip particle;
- splicing the at least one patch model into a ribbon model;
- rendering the ribbon model based on the at least one strip particle map, to obtain a strip particle primitive model,
- wherein the plurality of trail particle primitive models comprise the strip particle primitive model, and the strip portion is formed by the strip particle primitive model.

13. The method according to claim 10, wherein the plurality of trail particles further comprise at least one strip particle, the at least one strip particle is used for generating a strip portion in the firework trail,
- the at least one trail particle map group further comprises a strip map group, the strip map group comprises at least one strip particle map;
- the respectively rendering the plurality of trail particles based on the at least one trail particle map group and the plurality of trail particle attribute values, to obtain the plurality of trail particle primitive models, comprises:
- acquiring a preset ribbon model, wherein the preset ribbon model comprises a plurality of patch models;
- adjusting the plurality of patch models of the preset ribbon model, based on the at least one strip particle and attribute values of trail particle attributes corresponding to the at least one strip particle;
- distributing the plurality of patch models of the adjusted preset ribbon model onto the extension trajectory;
- rendering the adjusted preset ribbon model based on the at least one strip particle map, to obtain the strip particle primitive model,
- wherein the plurality of trail particle primitive models comprise the strip particle primitive model, and the strip portion is formed by the strip particle primitive model.

14. The method according to claim 1, wherein the target object is a hand, the feature point is a fingertip of the hand; and
- displaying the firework visual effect at a movement trajectory of the fingertip.

15. The method according to claim 1, further comprising:
- superimposing the firework visual effect in the video to be processed, to generate a video having the firework visual effect.

16. An electronic device, comprising:
a memory, configured to store computer-executable instructions in a non-transitory manner; and
a processor, configured to run computer-executable instructions,
wherein the computer-executable instructions, when run by the processor, implement a method for generating the firework visual effect,
wherein the firework visual effect comprises a firework center and a firework trail, the method comprises:
determining a visual effect trajectory;
based on the visual effect trajectory, generating a firework particle set and a trail particle set in a three-dimension space for generating the firework visual effect, wherein the firework particle set is used for generating the firework center, and the trail particle set is used for generating the firework trail;
rendering the firework particle set, to obtain a firework particle primitive model set;
rendering the trail particle set, to obtain a trail particle primitive model set, wherein the trail particle primitive model set comprises a plurality of trail particle primitive models;
superimposing the firework particle primitive model set and the trail particle primitive model set, to generate the firework visual effect,
wherein at least some trail particle primitive models among the plurality of trail particle primitive models are displayed for at least a preset duration;
wherein the determining a visual effect trajectory comprises:
determining a visual trajectory point; and
determining the visual effect trajectory according to a movement of the visual trajectory point;
wherein the determining a visual trajectory point, comprises:
acquiring a video to be processed;
detecting a target object in the video to be processed;
recognizing a feature point on the target object, and taking the feature point as the visual trajectory point;
wherein the method further comprises:
in response to the feature point moving out of the video to be processed, according to an order in which the plurality of trail particles are generated, sequentially adjusting particle lifetimes of at least some trail particles corresponding to the at least some trail particle primitive models, or sequentially adjusting transparency of the at least some trail particle primitive models to fully transparent, so as to make the firework trail gradually disappear.

17. A non-transitory computer-readable storage medium, wherein, the non-transitory computer-readable storage medium stores computer-executable instructions, and when executed by the processor, the computer-executable instructions implement a method for generating the firework visual effect,
wherein the firework visual effect comprises a firework center and a firework trail, the method comprises:
determining a visual effect trajectory;
based on the visual effect trajectory, generating a firework particle set and a trail particle set in a three-dimension space for generating the firework visual effect, wherein the firework particle set is used for generating the firework center, and the trail particle set is used for generating the firework trail;
rendering the firework particle set, to obtain a firework particle primitive model set;
rendering the trail particle set, to obtain a trail particle primitive model set, wherein the trail particle primitive model set comprises a plurality of trail particle primitive models;
superimposing the firework particle primitive model set and the trail particle primitive model set, to generate the firework visual effect,
wherein at least some trail particle primitive models among the plurality of trail particle primitive models are displayed for at least a preset duration;
wherein the determining a visual effect trajectory comprises:
determining a visual trajectory point; and
determining the visual effect trajectory according to a movement of the visual trajectory point;
wherein the determining a visual trajectory point, comprises:
acquiring a video to be processed;
detecting a target object in the video to be processed;
recognizing a feature point on the target object, and taking the feature point as the visual trajectory point;
wherein the method further comprises:
in response to the feature point moving out of the video to be processed, according to an order in which the plurality of trail particles are generated, sequentially adjusting particle lifetimes of at least some trail particles corresponding to the at least some trail particle primitive models, or sequentially adjusting transparency of the at least some trail particle primitive models to fully transparent, so as to make the firework trail gradually disappear.

* * * * *